US012357539B1

(12) United States Patent
Wu et al.

(10) Patent No.: US 12,357,539 B1
(45) Date of Patent: Jul. 15, 2025

(54) VIAL ADAPTER AND INJECTION KIT FOR WITHDRAWING A LIQUID MEDICAMENT FROM AN INJECTION VIAL

(71) Applicant: Genzyme Corporation, Cambridge, MA (US)

(72) Inventors: Haiming Wu, Weston, MA (US); Danial Ferreira, Woodbridge, CT (US)

(73) Assignee: Genzyme Corporation, Cambridge, MA (US)

(*) Notice: Subject to any disclaimer, the term of this patent is extended or adjusted under 35 U.S.C. 154(b) by 0 days.

(21) Appl. No.: 18/666,320

(22) Filed: May 16, 2024

(51) Int. Cl.
*A61J 1/20* (2006.01)

(52) U.S. Cl.
CPC ........... *A61J 1/2065* (2015.05); *A61J 1/2013* (2015.05); *A61J 1/2055* (2015.05)

(58) Field of Classification Search
None
See application file for complete search history.

(56) References Cited

U.S. PATENT DOCUMENTS

| | | | | |
|---|---|---|---|---|
| 3,977,555 | A * | 8/1976 | Larson | B65D 51/226 206/363 |
| 4,576,211 | A | 3/1986 | Valentini et al. | |
| 4,872,494 | A | 10/1989 | Coccia | |
| 4,997,430 | A | 3/1991 | Van der Heiden et al. | |
| 5,466,220 | A | 11/1995 | Brenneman | |
| 5,527,306 | A | 6/1996 | Haining | |
| 6,258,078 | B1 | 7/2001 | Thilly | |
| 6,474,375 | B2 | 11/2002 | Spero et al. | |
| 6,478,788 | B1 | 11/2002 | Aneas | |
| 6,558,365 | B2 | 5/2003 | Zinger et al. | |
| 6,656,433 | B2 | 12/2003 | Sasso | |

(Continued)

FOREIGN PATENT DOCUMENTS

| | | | | |
|---|---|---|---|---|
| JP | 2020116434 A * | 8/2020 | | A61J 1/1406 |
| WO | WO 2004/058820 A2 | 7/2004 | | |

(Continued)

OTHER PUBLICATIONS

Hamers-Casterman et al., "Naturally occurring antibodies devoid of light chains," Nature, Jun. 3, 1993, 363(6428):446-448.

(Continued)

*Primary Examiner* — Rebecca E Eisenberg
*Assistant Examiner* — Matthew Wrubleski
(74) *Attorney, Agent, or Firm* — Fish & Richardson P.C.

(57) ABSTRACT

A vial adapter for connecting to an injection vial comprises a barrel and a barrel head with an outlet that is sealed by a pierceable stopper. The vial adapter comprises an adapter body comprising a top wall and a sidewall. The sidewall projects from the top wall in a longitudinal direction to form a receptacle with a distal side of the top wall The receptacle is configured to receive at least a portion of the barrel head. A movable part comprises a base part and an elongated fluid channel extending through the top wall along the longitudinal direction. The elongated fluid channel comprises a proximal channel section merging into a mechanical connector, and a distal channel section with a channel aperture. The movable part is adjustably movable relative to the adapter body along the longitudinal direction to align the channel aperture with an inside surface of the pierceable stopper.

15 Claims, 7 Drawing Sheets

(56) References Cited

U.S. PATENT DOCUMENTS

| | | | | |
|---|---|---|---|---|
| 7,326,194 | B2 | 2/2008 | Zinger et al. | |
| 7,896,849 | B2 | 3/2011 | Delay | |
| 8,425,487 | B2 | 4/2013 | Beiriger et al. | |
| 8,562,584 | B2 | 10/2013 | Beiriger et al. | |
| 8,684,992 | B2 | 4/2014 | Sullivan et al. | |
| 9,132,061 | B2 | 9/2015 | Beiriger | |
| 9,339,438 | B2 | 5/2016 | Lev et al. | |
| 9,345,643 | B2 | 5/2016 | Okiyama | |
| 10,159,788 | B2 * | 12/2018 | Schriver | A61J 1/201 |
| 10,420,927 | B2 | 9/2019 | Fangrow | |
| 10,596,068 | B2 | 3/2020 | Okiyama et al. | |
| 10,688,295 | B2 | 6/2020 | Lev et al. | |
| 10,765,604 | B2 | 9/2020 | Denenburg et al. | |
| 10,945,921 | B2 | 3/2021 | Denenburg | |
| 11,642,285 | B2 | 5/2023 | Deneburg et al. | |
| 11,696,871 | B2 | 7/2023 | Seifert et al. | |
| 11,786,443 | B2 | 10/2023 | Lev et al. | |
| 2002/0193777 | A1 | 12/2002 | Aneas | |
| 2004/0210207 | A1 | 10/2004 | Amisar et al. | |
| 2006/0287638 | A1 | 12/2006 | Aneas | |
| 2006/0287639 | A1 | 12/2006 | Sharp | |
| 2008/0177237 | A1 | 7/2008 | Stonehouse et al. | |
| 2008/0300536 | A1 | 12/2008 | Wang et al. | |
| 2009/0069783 | A1 | 3/2009 | Ellstrom et al. | |
| 2010/0241270 | A1 | 9/2010 | Eliuk et al. | |
| 2010/0298806 | A1 | 11/2010 | Yandell | |
| 2011/0087164 | A1 | 4/2011 | Mosler et al. | |
| 2013/0144246 | A1 | 6/2013 | Takemoto | |
| 2013/0172818 | A1 | 7/2013 | Schraga | |
| 2013/0340891 | A1 | 12/2013 | Steube | |
| 2014/0230952 | A1 | 8/2014 | Higuchi et al. | |
| 2015/0020919 | A1 | 1/2015 | Wu et al. | |
| 2015/0126958 | A1 | 5/2015 | Sanders et al. | |
| 2016/0000653 | A1 | 1/2016 | Kramer | |
| 2016/0296420 | A1 | 10/2016 | Salimnia | |
| 2018/0036203 | A1 | 2/2018 | Zelinski | |
| 2018/0344571 | A1 | 12/2018 | Cowan et al. | |
| 2019/0175450 | A1 | 6/2019 | Aneas | |
| 2019/0344009 | A1 | 11/2019 | Damiano et al. | |
| 2019/0381237 | A1 | 12/2019 | Desbrosses et al. | |
| 2020/0230026 | A1 | 7/2020 | Santos | |
| 2020/0282133 | A1 | 9/2020 | Mason et al. | |
| 2020/0316360 | A1 * | 10/2020 | Naygauz | A61J 1/2048 |
| 2021/0154097 | A1 | 5/2021 | McLoughlin et al. | |
| 2021/0228446 | A1 | 7/2021 | Herrmann | |
| 2022/0087902 | A1 | 3/2022 | Hsieh | |
| 2022/0211952 | A1 | 7/2022 | Beguin et al. | |
| 2023/0052165 | A1 | 2/2023 | Bar-El et al. | |
| 2023/0097647 | A1 | 3/2023 | Berg et al. | |
| 2023/0321344 | A1 | 10/2023 | Andersen et al. | |
| 2024/0017049 | A1 | 1/2024 | Vikash et al. | |
| 2025/0107970 | A1 | 4/2025 | Chen et al. | |

FOREIGN PATENT DOCUMENTS

| | | | |
|---|---|---|---|
| WO | WO 2004/068820 | A2 | 8/2004 |
| WO | WO 2005/018629 | A1 | 3/2005 |
| WO | WO 2006/003388 | A2 | 1/2006 |
| WO | WO 2006/030220 | A1 | 3/2006 |
| WO | WO 2007/017868 | A1 | 2/2007 |
| WO | WO 2017/057476 | A1 | 4/2017 |
| WO | WO 2020/208626 | A1 | 10/2020 |
| WO | WO 2024/142545 | A1 | 7/2024 |

OTHER PUBLICATIONS

Holt et al., "Domain antibodies: proteins for therapy," Trends in Biotechnology, Nov. 2003, 21(11):484-490.

Muyldermans, "Single domain camel antibodies: current status," Reviews in Molecular Biotechnology, Jun. 2001, 74(4):277-302.

Needle-based injection systems for medical use Requirements and test methods, Part 1: Needle injection systems, ISO 11608-1:2014(E), Third Edition, Switzerland, ISO, Dec. 15, 2014, pp. 1-13.

Ward et al., "Binding activities of a repertoire of single immunoglobulin variable domains secreted from *Escherichia coli*, " Nature, Oct. 1, 1989, 341(6242):544-546.

U.S. Appl. No. 18/666,279, filed May 16, 2024, Haiming Wu.

U.S. Appl. No. 18/666,379, filed May 16, 2024, Haiming Wu.

U.S. Appl. No. 18/666,417, filed May 16, 2024, Haiming Wu.

Westpharma.com [online], "Vial Adapter Transfer Device," Sep. 25, 2023, retrieved on May 8, 2025, retrieved from URL <https://www.westpharma.com/products/vial-adapter-systems/vented-swabable-syringe-vial-adapters>, 4 pages.

* cited by examiner

VIAL ADAPTER AND INJECTION KIT FOR WITHDRAWING A LIQUID MEDICAMENT FROM AN INJECTION VIAL

TECHNICAL FIELD

The present disclosure relates to the field of vial adapters configured for fastening to an injection vial and for withdrawing a liquid medicament from the injection vial, e.g., by an injection device, such as a syringe. in a further aspect the disclosure relates to an injection kit comprising an injection vial and a vial adapter as well as to a method of withdrawing a liquid medicament contained in an injection vial by making use of a vial adapter.

BACKGROUND

Patients suffering from certain diseases like, for example, haemophilia or requiring enzyme replacement therapy have to take regular intravenous (IV) infusions. The infusions often have to be mixed and prepared, sometimes to the specific needs of the patient, (and sometimes a short time before drug administration) which may include reconstitution of the drug powder from multiple vials using an exact amount of sterile liquids like water and/or saline. As this preparation process is typically complex and tedious, it is usually performed by a health care professional in a clinic or pharmacy, potentially using lab equipment.

Generally, administering a medicament by way of infusion may require a rather clean or sterile environment. A patient may therefore have to regularly visit an ambulance or health care center.

Self-medication or home-medication for administering a medicament through infusion or injection is and remains quite challenging but is very attractive for patients thereby avoiding problems and circumstances involved in visiting a health care center. With home- or self-medication a patient or user, e.g. intending to establish a vascular access to a patient's body, may be obliged to use only one hand, which might be rather cumbersome and thus challenging.

In addition, it is often required to establish or maintain a clean and/or sterile environment especially in the field of home-medication or self-medication as well as providing of a clean and sterile storage environment for medicaments and medicament containers, medical device accessory and medical devices.

It is therefore desirable to provide improvements in the field of home medication or self-medication, which allow a user or caregiver to prepare and to administer a medicament by way of injection or infusion. It is further desirable to provide an improved storage and transportation of medical devices, medicaments, medical device accessory and the like components required for home- or self-medication. Furthermore, there should be provided improvements in guiding and assisting a user in conducting or executing numerous steps in the course of preparing medicaments and/or in the course of preparing administering of a medicament, e.g. by way of infusion or injection.

Some medicaments to be administered by injection or infusion may be provided in a co-called injection vial, either in liquid or powdered form. Such injection vials typically comprise a barrel filled with the medicament either in a liquid or powdered form. The barrel is typically sealed towards an outlet by a pierceable stopper. The pierceable stopper may be fixed to a barrel head, which may also provide a mechanical fastening for a vial adapter.

Vial adapters are widely known in the art and may provide a well-defined fastening to the barrel head of an injection vial. They may comprise a spike to penetrate the pierceable stopper sealing the outlet of the injection barrel. The spike is typically in fluid communication with a connector, e.g. implemented as a standardized connector that may provide a mechanical fastening of an injection device so that the liquid content provided inside the injection vial can be withdrawn by the injection device, e.g. by a syringe or the like medicament container connectable to the vial adapter.

With some vial adapters the spike configured to pierce the pierceable stopper of the vial comprises a cannula with an inlet opening near a tipped end of the spike. In use and when the vial adapter is fastened to the injection vial and when the spike has penetrated the pierceable stopper the inlet opening of the cannula may be located at a non-neglectable distance from an inside surface of the pierceable stopper. Such distances are difficult to control or to define because they predominately arise from manufacturing, design and/or assembly tolerances of the stopper and/or of the barrel. In use and when the medicament is to be withdrawn from the injection vial, the injection vial with the vial adapter attached thereto may be held upside down.

Since the inlet opening of the spike or of the cannula of the vial adapter through which the liquid medicament can be withdrawn from the interior of the injection vial, is located at a longitudinal distance from the inside surface of the pierceable stopper a complete emptying or nearly complete emptying of the injection vial may become quite tricky and cumbersome if not impossible.

Hence, with known solutions of vial adapters a complete or nearly complete withdrawal and/or emptying of the injection vial may not be achievable in a straightforward manner. When using such vial adapters a residual amount of the medicament may always remain inside the cavity or interior of the injection vial.

In situations or with examples wherein the liquid medicament is comparatively expensive or when the total volume of the injection vial is quite limited such leftovers inside the injection vial may be no longer acceptable and should be avoided.

It is therefore desirable to provide an improved vial adapter that enables or provides a complete or nearly complete emptying of an injection vial, such that a residual amount of medicament left in the injection vial can be minimized or can be even avoided.

SUMMARY

The above-mentioned disadvantages and shortcomings are solved by vial adapter, by an injection kit and by a method of withdrawing a liquid medicament in accordance to the features of the independent claims. Various examples and embodiments are subject matter of the dependent claims, respectively.

In one aspect there is provided a vial adapter for connecting to an injection vial. The injection vial comprises a barrel and a barrel head. The barrel head comprises or forms an outlet, through which a liquid medicament located inside a cavity or interior volume of the barrel can be withdrawn from the injection vial. The outlet is sealed by a pierceable stopper and the pierceable stopper comprises an inside surface, e.g. facing towards the cavity of the injection vial.

The vial adapter, which is configured for connecting to the injection vial, comprises an adapter body and a movable part. The adapter body comprises a top wall and a sidewall. The sidewall projects from the top wall, e.g. from an outer circumference or outer edge of the top wall in a longitudinal direction. The sidewall of the adapter body projects or protrudes from the top wall in longitudinal direction to form a receptacle, e.g., a cup-shaped receptacle to with an inside surface or distal side of the top wall. The cup-shaped receptacle is configured to receive at least a portion of the barrel head. The receptacle may be configured to engage, e.g., to mechanically engage or to mechanically fasten to the barrel head of the injection vial.

The vial adapter further comprises a movable part. The movable part comprises a base part and an elongated fluid channel. The fluid channel extends through the top wall and/or through the base part along the longitudinal direction. The elongated fluid channel further comprises a proximal channel section merging into a mechanical connector and further comprises a distal channel section with a channel aperture. The movable part is adjustably movable relative to the adapter body along the longitudinal direction in order to align the channel aperture with the inside surface of the pierceable stopper of the injection vial.

The mechanical connector may provide a mechanical connection to an external fluid withdrawing device, such as an injection device, e.g., implemented as a syringe. In use, the mechanical connector may be in fluid communication with the proximal channel section of the elongated fluid channel so as to provide a fluid transfer from the channel aperture of the elongated fluid channel through the fluid channel towards and into the proximal channel section.

Since the movable part is longitudinally movable relative to the adapter body there can be provided an adjustable longitudinal position of the channel aperture inside the injection vial when the elongated fluid channel has penetrated the pierceable stopper of the injection vial and when the adapter body is engaged with the barrel head or when the adapter body is fastened to the barrel of the injection vial.

By adjustably moving the movable part of the vial adapter relative to the adapter body there can be provided a longitudinal alignment of the channel aperture of the fluid channel with the inside surface of the pierceable stopper. In other words, a penetration depth of the fluid channel extending through the top wall of the adapter body and extending through the pierceable stopper of the vial can be adjusted such that a longitudinal distance between the channel aperture and the inside surface of the pierceable stopper is minimized.

In some examples a longitudinal distance between the channel aperture of the fluid channel of the movable part and the inside surface of the pierceable stopper of the injection vial can be minimized to zero. Hence, the channel aperture of the fluid channel may flush, e.g., in transverse direction, with the inside surface of the pierceable stopper.

In further examples the channel aperture may even longitudinally overlap with the inside surface of the pierceable stopper. In this way, it can be even guaranteed, that the channel aperture, through which the liquid medicament can be withdrawn from the cavity of the injection vial is at a lower most longitudinal position when the injection vial with the vial adapter attached thereto is in an inverted configuration, i.e. an upside-down configuration, for withdrawing the liquid medicament from the injection vial. In this way and by aligning the channel aperture of the fluid channel of the movable part of the vial adapter to the inside surface of the pierceable stopper the entirety of the medicament can be rather easily withdrawn into the channel aperture and through the fluid channel towards the mechanical connector of the movable part and further into an injection device or other external device configured for receiving the liquid medicament or liquid substance originally contained inside the injection vial.

In some examples the movable part is longitudinally movable relative to the adapter body within a limited longitudinal extent, which is large enough to compensate for eventual manufacturing and assembly tolerances of the barrel, the vial adapter and the mutual assembly of the vial adapter and the barrel of the injection vial.

In some examples the maximum longitudinal displacement between the movable part and the adapter body is less than 1 cm, less than 8 mm or less than 5 mm.

Moreover, the adapter body and the movable part may be non-detachably connected. The movable part may be movable in longitudinal direction relative to the adapter body within a limited range, wherein the limited range is governed or determined by manufacturing tolerances and/or assembly tolerances of at least one of the vial adapter, the injection vial and the pierceable stopper.

In further examples the movable part is not only adjustably movable relative to the adapter body along the longitudinal direction. It may be variably movable and variably fixable relative to the adapter body. In some examples the movable part may be steplessly and hence continuously movable relative to the adapter body along the longitudinal direction. The movable part may be fixable relative to the adapter body in any longitudinal position relative to the movable part.

In this way, the channel aperture of the elongated fluid channel of the movable part may not only temporarily align or overlap with the inside surface of the pierceable stopper but may also be fixed relative to the adapter body and hence to the pierceable stopper in any of the adjustable longitudinal positions relative to the movable part and/or relative to the pierceable stopper. In this way, the channel aperture of the fluid channel can be fixed relative to the pierceable stopper and/or relative to the adapter body such that the aligned position or arrangement of the channel aperture at or with the inside surface of the pierceable stopper can be maintained during the process of withdrawal of the liquid content from the injection vial.

In this way, the vial adapter can be configured to compensate for eventual manufacturing tolerances and/or assembly tolerances of at least one of the injection vial, the barrel, the barrel head and the dimensions or position of the pierceable stopper.

According to a further example the movable part is movable relative to the adapter body along the longitudinal direction through user interaction. Hence, the movement of the movable part relative to the adapter body can be user-induced and/or may be user-controlled. In this way, a user is given the possibility to manually adjust the longitudinal position of the movable part relative to the adapter body, thereby manually and individually adjusting the longitudinal position of the channel aperture relative to the inside surface of the pierceable stopper when the adapter body is fixed or fastened to the barrel head of the barrel of the injection vial.

In this way, the vial adapter provides a user-controllable or user-inducible manual adjustment of the longitudinal position of the movable part and hence of the channel aperture relative to the adapter body and hence relative to the inside surface of the pierceable stopper.

In typical use scenarios a user may induce a longitudinal movement of the movable part relative to the adapter body in the course or after fixing the adapter body to the barrel or barrel head of the injection vial. The limited longitudinal movability of the movable part relative to the adapter body and the possibility of fixing the movable part relative to the adapter body in any of the available longitudinal positions relative to the adapter body allows to arrange the channel aperture of the fluid channel in direct vicinity to the inside surface of the pierceable stopper, such that a longitudinal distance between the channel aperture of the elongated fluid channel and the inside surface of the pierceable stopper is minimized, or even eliminated.

According to a further example the adapter body comprises a longitudinally extending guiding structure with a guiding receptacle, in which the movable part is movably guided in the longitudinal direction. By way of the guiding receptacle the movable part can be guided in longitudinal direction relative to the adapter body. Providing a guiding receptacle to receive the movable part may provide a rather stable and tilt free longitudinal displacement of the movable part relative to the adapter body.

Moreover, by way of a guiding receptacle, the outer dimensions of the movable part can be minimized so as to fit into the interior of the guiding receptacle. The guiding receptacle and hence the guiding structure of the adapter body allows for a rather conventional design of the receptacle of the adapter body, such that a fastening to the injection vial can be provided in a rather conventional and well-established manner. At the same time a guiding receptacle provides a rather efficient and straightforward longitudinal guiding for the movable part relative to the adapter body.

According to a further example the guiding receptacle of the adapter body comprises a receptacle sidewall. The base part of the movable part comprises a base part sidewall with an outside surface, which is at least in sections complementary shaped to the receptacle sidewall. Typically, the receptacle sidewall comprises an inside facing surface that is complementary shaped to the outside surface of the base part sidewall. In this way, there can be provided a rather well-defined, stable and easily controllable longitudinal displacement of the movable part relative to the adapter body. The receptacle sidewall of the guiding receptacle and hence of the adapter body may provide a rather tilt free and hence a rather precise longitudinal displacement of the movable part relative to the adapter body.

According to a further example the guiding receptacle is threadedly engaged with the base part of the movable part. A threaded engagement allows and provides for a rather well-defined and easily controllable longitudinally guided displacement of the movable part relative to the adapter body. Here, and by rotating the movable part as defined by the threaded engagement with the adapter body there can be provided a well-defined longitudinal displacement of the movable part and hence of the fluid channel with its channel aperture relative to the adapter body and also relative to the pierceable stopper when the adapter body is fixed to the injection vial.

Moreover, by a threaded engagement there can be provided a stepless and rather continuous longitudinal displacement of the movable part relative to the adapter body. Simultaneously, there can be provided an immediate longitudinal fixing of the movable part relative to the adapter body, namely when the movable part is not or is no longer rotated relative to the adapter body.

According to a further example of the vial adapter the base part of the movable part comprises an insert portion, which is longitudinally guided in a through bore of the adapter body. The through bore of the adapter body extends longitudinally through the adapter body. It may extend longitudinally through the top wall of the adapter body. The through bore typically comprises an inner thread complementary shaped and engageable with an outer thread of the insert portion. By rotating the insert portion relative to the adapter body there can be provided a well-defined longitudinal adjustable displacement or movement of the movable part relative to the adapter body. Rotating of the movable part relative to the adapter body for obtaining a longitudinal position adjustment of the channel aperture relative to the inside surface of the pierceable stopper can be provided at any time, e.g. before, during or after fastening the vial adapter to the injection vial.

According to a further example the base part of the movable part further comprises a radially widened flange portion that protrudes radially outwardly from the base part. Here, the base part may comprise a cup-shaped structure. By way of the radially widened flange portion there is provided a kind of a gripping or gripping structure for a user to induce a torque or angular momentum onto the movable part for inducing a rotation of the movable part relative to the adapter body, which rotation causes a respective longitudinal displacement of the movable part relative to the adapter body due to the threaded engagement of the movable part and the adapter body.

An outside surface or an outer rim of the radially widened flange portion may be provided with a gripping structure, e.g. with a rippled structure for ease of handling and/or for providing a rather slip-free gripping of the flange portion for manually introducing or applying a torque onto the flange portion.

In some examples the flange portion may comprise a rather planar disk-like shape. It may be provided at a proximal side of the top wall of the adapter body. It may be located at a pre-defined proximal distance from the guiding receptacle of the adapter body. At the same time and since the receptacle, e.g. the receptacle sidewall comprises a proximally facing end face and since the flange portion comprises an outer diameter that exceeds the outer or inner diameter of the receptacle sidewall the distal face of the radially widened flange portion may form or constitute a distal stop face to engage with the proximal end face of the receptacle sidewall thereby delimiting a distally directed longitudinal movement of the movable part relative to the adapter body.

According to a further example the base part of the movable part is in longitudinal sliding engagement with the guiding receptacle. By way of a sliding engagement there can be likewise provided a variable and longitudinally adjustable variable position of the movable part relative to the adapter body.

A sliding engagement may likewise provide a user-adjustable or user-controllable longitudinal position adjustment for the movable part relative to the adapter body and/or relative to the pierceable stopper, e.g., in order to obtain a desirable alignment of the channel aperture of the fluid channel of the movable part and the inside surface of the pierceable stopper of the injection vial.

A sliding engagement between the guiding receptacle and the movable part may be rather easily controllable. Moreover, a sliding engagement may provide a rather intuitive handling for varying the longitudinal position of the channel aperture of the fluid channel of the movable part relative to the adapter body and/or relative to the pierceable stopper of the injection vial.

According to a further example the receptacle sidewall comprises a through recess, e.g. a lateral through recess. The movable part comprises a lateral projection extending radially through the through recess. The through recess of the receptacle sidewall may comprise a longitudinal extent that defines a maximum longitudinal displacement of the movable part relative to the adapter body. Accordingly, and with further examples the through recess may be delimited in distal direction by a distal stop face and may be further limited in proximal direction by a proximal stop face. The proximal stop face faces distally and the distally located stop face faces proximally.

Accordingly, the lateral projection of the movable part, which extends radially through the through recess may longitudinally abut with one of the distal or proximal stop faces as defined by the through recess when the lateral projection is urged in longitudinal distal or longitudinal proximal direction by a user. In this way there can be provided a limited longitudinal displacement of the movable part relative to the adapter body, which is large enough to compensate manufacturing tolerances as well as assembly tolerances of the injection vial and the vial adapter.

In examples wherein the movable part is in longitudinal sliding engagement with the guiding receptacle the movable part may comprise a gliding surface, e.g. on its base part sidewall and the guiding receptacle may comprise an inside facing complementary shaped gliding or sliding surface in order to provide a smooth longitudinal gliding or sliding of the movable part relative to the adapter body. Here, the base part of the movable part may longitudinally slide or glide relative to the receptacle sidewall of the guiding receptacle of the adapter body.

In a further example the through recess of the receptacle sidewall of the adapter body comprises a distally facing stop face. The through recess may be further delimited in proximal direction by the distally facing stop face. The distally facing stop face is configured to longitudinally abut with the lateral projection, e.g., with a proximally facing stop face of the lateral projection.

Likewise, the through recess may also comprise a proximally facing stop face. It may be delimited by the proximally facing stop face. The proximally facing stop face is configured to longitudinally abut with the lateral projection, typically, with a distally facing and complementary shaped stop face of the lateral projection. In this way, the longitudinal displacement of the movable part relative to the adapter body can be precisely delimited by the longitudinal extent of the through recess extending through the receptacle sidewall.

Moreover, the lateral projection protruding through the through recess of the receptacle sidewall may form or constitute a kind of a handle to be gripped by a person to induce a longitudinal displacement of the movable part relative to the adapter body. Here, a rather intuitive handling is provided since a person or user inducing a longitudinal displacement of the movable part relative to the adapter body, e.g., by gripping and by moving the portion of the lateral projection that protrudes radially outwardly from the through recess of the receptacle sidewall, is immediately provided with a haptic and/or visual feedback to which extend the movable part can be axially moved relative to the adapter body in longitudinal direction.

According to a further example the guiding receptacle comprises a bottom facing in a longitudinal proximal direction. The movable part comprises an abutment face facing in a longitudinal distal direction. The abutment face of the movable part may be opposite the bottom of the guiding receptacle. In some examples the bottom of the guiding receptacle may be flush or may be at the same or substantially the same longitudinal position than a proximally facing outside surface of the top wall. Here, the guiding receptacle and hence the receptacle sidewall of the guiding receptacle of the adapter body may protrude proximally from an upper side or proximal side of the top wall of the adapter body. The guiding receptacle may be located in a radial center or transverse center region of the top wall.

In some examples the through recess of the receptacle sidewall may flush with the bottom of the guiding receptacle. Here, the lateral projection may comprise or may constitute a lateral extension of the abutment face of the movable part. The abutment face of the movable part may comprise a shape or structure that is complementary to the bottom of the guiding receptacle of the adapter body. In some examples the abutment face of the movable part is a lower abutment face facing in distal direction and comprising or constituting a bottom face of the movable part.

According to a further example the abutment face of the movable part is configured to longitudinally abut with the bottom of the guiding receptacle. In this way, the distally directed longitudinal displacement of the movable part relative to the adapter body can be delimited by a longitudinal engagement or abutment of the bottom of the guiding receptacle with the abutment face or bottom face of the movable part.

According to a further example the vial adapter comprises a biasing element arranged between the bottom of the guiding receptacle and the abutment face of the movable part. The biasing element is configured to apply a biasing force between the adapter body and the movable part to increase a longitudinal distance between the abutment face and the bottom. In some examples the biasing element may be in direct abutment with both or with at least one of the abutment face of the movable part and the bottom of the guiding receptacle and hence of the adapter body.

In this way, the biasing element is operable to urge the movable part in proximal direction. Accordingly, the movable part may be movable relative to the adapter body either under the action of the biasing element or against the action of the biasing element.

In some examples the biasing element is configured to apply a force between the adapter body and the movable part in order to increase a longitudinal distance of the abutment face of the movable part and the bottom of the guiding receptacle of the adapter body. When mounted or fastened to the injection vial the biasing element serves to displace the channel aperture and hence the fluid channel in proximal direction to and hence towards the pierceable stopper. In this way, the biasing element serves to move the movable part with a fluid channel and the channel aperture towards or even into the pierceable stopper in proximal direction, i.e. in a direction facing outwardly as seen from the interior of the injection vial.

According to a further example the biasing element comprises a helical spring. The helical spring may be in longitudinal abutment with the bottom of the guiding receptacle and it may be further in longitudinal abutment with the abutment face of the movable part. Hence, a first longitudinal end of the helical spring may be in longitudinal abutment with the bottom of the guiding receptacle. An opposite longitudinal end of the helical spring may be in abutment with the abutment face of the movable part.

The helical spring may be implemented as a compression spring. Here, a compression force acting in longitudinal direction may be required to reduce the longitudinal extent of the helical spring. In the absence of such a compression force, the helical spring may be configured to increase the longitudinal distance between the abutment face of the movable part and the bottom of the guiding receptacle.

According to a further example the fluid channel of the vial adapter comprises an elongated channel side wall and a channel projection. The channel projection protrudes laterally or radially outwardly from the elongated channel sidewall and comprises a proximally facing abutment face to abut longitudinally with the inside surface of the pierceable stopper. Here, the channel projection may provide a well-defined longitudinal abutment with the inside surface of the pierceable stopper after having penetrated the pierceable stopper in distal direction. The channel projection with its proximally facing abutment face serves to prevent an uncontrolled movement or disengagement of the fluid channel relative to the piercable stopper in proximal direction. It provides a well-defined longitudinal abutment of the channel aperture at the inside surface of the pierceable stopper so as to provide a rather precise alignment of the channel aperture with the inside surface of the pierceable stopper.

In some examples, the channel projection substantially aligns or coincides with the channel aperture as seen in longitudinal direction. The channel projection may adjoin the channel aperture or it may be provided at an opposite side of the channel sidewall compared to the channel aperture. By way of the channel projection an uncontrolled movement of the fluid channel through the pierceable stopper in proximal direction can be effectively prevented. Rather and by way of the channel projection there can be provided a well-defined longitudinal position of the fluid channel relative to the pierceable stopper such that the channel aperture aligns with the inside surface of the pierceable stopper, which alignment enables a complete or nearly complete withdrawal of the liquid contained of the injection vial.

According to a further example the channel projection is resiliently deformable in radial direction. A resiliently deformable channel projection may provide an easy penetration of the pierceable stopper upon introducing or piercing the pierceable stopper distally in the course of mounting or fastening the vial adapter to the injection vial. However, the channel projection may be only resiliently deformable when introduced through the pierceable stopper in distal direction e.g., in the course of attaching or assembling the vial adapter to the injection vial.

In order to provide a precise alignment of the channel aperture with the inside surface of the pierceable stopper it may be intended to move the movable part in proximal direction relative to the adapter body after fastening or engaging the adapter body with the barrel head until the channel projection abuts or engages with the inside surface of the pierceable stopper.

According to a further example the channel projection comprises a beveled section facing in the longitudinal distal direction. The beveled section may cause a radial deformation, e.g. in the course of introducing or penetrating the pierceable stopper with the elongated fluid channel. However and as the channel projection has passed through the pierceable stopper and when the channel projection arrives in the interior of the injection vial, e.g. distally of the pierceable stopper, the channel projection may relax or may return into its initial shape, in which the proximally facing abutment face protrudes radially outwardly from the channel sidewall so as to engage or to abut in proximal direction with the distally facing inside surface of the pierceable stopper. This engagement or abutment may be obtained through a proximally directed displacement of the movable part relative to the adapter body.

According to a further example the channel projection is longitudinally aligned with the channel aperture. Hence, the longitudinal position of the channel projection may overlap or may substantially coincide with a longitudinal position of the channel aperture. In this way, it can be provided that the channel aperture, which is in fluid communication with the elongated fluid channel of the movable part, is longitudinally aligned with the inside surface of the pierceable stopper. In an upside-down configuration, wherein the barrel head and hence the pierceable stopper is located at a lower most portion of the injection vial it can be provided that the entire liquid content or liquid substance inside the injection vial can be withdrawn through the channel aperture and through the elongated fluid channel towards the mechanical connector of the vial adapter and hence to an injection device or other kind of a medicament container connectable to the mechanical connector.

According to a further example the channel projection is an integral part of the elongated channel sidewall and comprises a resiliently deformable tongue, which at least in sections flushes with the elongated channel sidewall and which at least in sections is separated from the elongated channel sidewall by at least one longitudinally extending slit. In some examples the tongue may be formed by a U-shaped cutout of the elongated channel side wall. By way of U-shaped slit structure extending through the channel sidewall there can be provided a resiliently deformable flap or tongue, which in addition to its resilient deformability may be provided with the radially outwardly protruding channel projection protruding from an outside surface of the channel sidewall.

The at least one or numerous longitudinally extending slit(s) may provide or may constitute the channel aperture, through which the liquid content provided in the injection vial can be introduced into the fluid channel.

Accordingly, and in some examples the channel aperture of the elongated fluid channel and the channel projection may substantially overlap or coincide. In this way, there can be provided a rather straightforward alignment of the channel aperture with the inside surface of the pierceable stopper, namely when a longitudinal abutment of the proximally facing abutment face of the channel projection engages or gets in longitudinal abutment with the inside surface of the pierceable stopper of the injection vial.

According to a further example the channel projection of the fluid channel and hence of the movable part comprises or forms a barb to engage with the inside surface of the pierceable stopper. A barb may comprise a beveled section facing in the longitudinal distal direction and may further comprise a stepped portion and hence a proximally facing abutment face protruding radially outwardly from the channel sidewall of the fluid channel and being operable to engage with the distally facing inside surface of the pierceable stopper. The stepped portion may be provided at a proximal end of the beveled section.

In some examples there may be provided only one channel projection protruding radially outwardly from the channel sidewall. In other examples there may be provided two channel projections projecting radially outwardly on opposite sides of the channel sidewall. Here, first and second channel projections may protrude diametrically opposite as seen in lateral or transverse direction of the elongated channel sidewall. In further examples there may be even provided three or four radially outwardly protruding channel projections, which may equally abut with the inside surface of the pierceable stopper.

The numerous channel projections may be equally and/or equiangularly spaced around the outer circumference of the elongated channel sidewall. The numerous channel projections may be located at a common or at the same longitudinal position of the channel sidewall.

According to a further example the at least one channel projection is configured to fix the vial adapter to the injection vial at least with regards to the proximal longitudinal direction. Typically, and when the channel projection gets in proximally facing abutment with the distally facing inside surface of the pierceable stopper after having penetrated the pierceable stopper, the channel projection and hence the entire channel sidewall as well as the fluid channel and the movable part, e.g. rigidly connected to the fluid channel, may be secured to the pierceable stopper with regard to a proximally directed displacement.

In this way, there can be even provided a proximal fastening for the movable part to the pierceable stopper. Since the movable part is longitudinally displaceable relative to the adapter body only within predefined margins and/or within a predefined range there can be achieved a respective fastening of the entire movable part as well as of the adapter body to the injection vial via the channel projection. Here and for this it may not be necessary that the sidewall of the adapter body is mechanically fastened or fixed to the barrel head. It may be sufficient when the receptacle of the adapter body, which is formed or delimited by the inside surface or distal side of the top wall and the sidewall of the adapter body, is sized to receive at least a portion of the barrel head of the injection vial. A longitudinal fastening of the vial adapter to the injection vial may be exclusively or predominately provided by the channel projection of the elongated fluid channel of the movable part.

Insofar and according to another example the sidewall of the adapter body of the vial adapter may be void of a mechanical fastener or snap feature that would be configured to engage with the barrel head.

According to another example the vial adapter further comprises a spike. The spike comprises a tipped end facing in distal direction. The spike and hence the tipped end thereof is configured to penetrate the pierceable stopper. Typically, the tipped end is configured to pierce and/or to penetrate the pierceable stopper of the injection vial during assembling or attaching the vial adapter, i.e. the adapter body, to the barrel head of the injection vial.

Typically, the spike may protrude from a lateral or transverse central portion of the top wall of the adapter body in longitudinal distal direction. It may extend substantially parallel to the sidewall of the adapter body. It may be located coaxial with sidewall of the adapter body, which may be of tubular shape.

In some examples the spike is arranged at the adapter body and/or it might be unitarily shaped with the adapter body. The spike comprises a hollow spike channel, in which the elongated fluid channel of the movable part is located or in which the elongated fluid channel of the movable part is longitudinally guided. Hence, there may be provided a kind of a telescopic arrangement of the spike channel and the elongated fluid channel of the movable part.

In some examples, wherein the spike is unitarily shaped with the adapter body there may be provided a movable fluid channel, that is telescopically arranged and/or or which is longitudinally displaceable in the hollow spike channel.

Here and according to another example the spike channel comprises a longitudinally extending slit, in which at least one of the projection of the elongated channel sidewall and the channel aperture of the fluid channel is positioned and/or longitudinally guided. Moreover, the longitudinally extending slit of the spike channel, e.g. of a spike channel sidewall, may be penetrated or traversed by the projection or channel projection of the fluid channel.

Insofar, the elongated slit of the spike channel may provide a longitudinal and non-rotating guidance for the channel projection of the elongated channel sidewall of the fluid channel of the movable part.

In addition, the elongated fluid channel, e.g. its channel sidewall may provide a seal by way of which the longitudinally extending slit of the spike channel it effectively sealed. Since the channel sidewall and hence the fluid channel is longitudinally movable relative to the spike channel the longitudinal extent of the longitudinally extending slit of the spike channel is comparatively long and may even traverse the pierceable stopper of the injection vial in longitudinal direction.

In order to prevent leakage or ingress of air into the interior of the injection vial through the spike channel the elongated fluid channel at least in sections effectively seals the longitudinally extending slit of the spike channel.

In some examples, the channel aperture of the fluid channel overlaps with or is located inside the spike channel and/or the elongated slit of the spike channel.

In this example it is even conceivable that the channel aperture of the elongated fluid channel is provided at a longitudinal distal end, e.g., at distal end face of the fluid channel. Here, the fluid channel itself may be void of a tipped end since it is longitudinally guided inside the spike channel, which in turn is provided with a tipped end configured to penetrate the pierceable stopper of the injection vial.

According to a further example the movable part of the vial adapter comprises an elongated cannula, through which the fluid channel extends longitudinally. The elongated cannula may comprise a kind of a mechanically rigid needle with a tipped end and provided with the channel aperture near or at the tipped end. Here, the adapter body may be void of an own spike. Rather, the elongated cannula may form or may contribute to a spike that is configured or operable to pierce or to penetrate the pierceable stopper of the injection vial. Here, the elongated cannula comprises a cannula sidewall coinciding or constituting the channel sidewall of the elongated fluid channel.

In some examples, the elongated cannula of the movable part may comprise the fluid channel. Insofar, all features, effects and benefits as described above with respect to the fluid channel equally apply to the elongated cannula, which may be fastened or fixed to the movable part or which may be even integrally formed with the movable part, e.g., to the base part of the movable part.

According to a further example the elongated cannula comprises a tipped distal end configured to penetrate the pierceable stopper. Here, the elongated cannula may replace or may substitute a separate spike, which may be provided in the receptacle formed by the distal side of the top wall and the sidewall of the adapter body.

In some examples the elongated cannula may protrude distally from the base part of the movable part. It may protrude distally from an insert portion of the movable part. In this way, the distal portion of the elongated cannula may extend or may protrude distally from the distal side of the top wall into the receptacle as formed or confined by the top wall and the sidewall of the adapter body. Accordingly, and upon assembly of the vial adapter to the barrel head of the injection vial the distal end of the elongated cannula may directly penetrate the pierceable stopper of the injection vial.

According to a further example the sidewall of the adapter body of the vial adapter comprises numerous resilient sidewall segments that are separated by an elongated slit extending in longitudinal direction. The resilient sidewall segments may be deflectable or radially outwardly. They may be provided with inwardly protruding snap features and their distal ends to engage with a stepped down neck portion adjoining the barrel head of the barrel of the injection vial.

The resilient sidewall segments may provide a snap fit engagement of the receptacle of the adapter body with the barrel head of the injection vial. In some examples the distal side of the top wall of the adapter body may directly engage or abut with a distal end face of the barrel head of the injection vial. When reaching such an abutment configuration, the resilient sidewall segments of the sidewall of the adapter body may relax into or towards their initial configuration thereby mechanically engaging with the barrel head and fixing the adapter body to the injection vial.

According to a further example the resilient sidewall segments comprise radially inwardly protruding snap features, e.g., at their distal end to mechanically engage with a complementary shaped barrel head of the barrel of the injection vial when reaching a final assembly configuration, in which the pierceable stopper of the injection vial may be pierced by at least one of the spike and the elongated cannula such that the channel aperture of the elongated fluid channel of the movable part aligns of flushes with the inside surface of the pierceable stopper.

Any geometric tolerances that may eventually lead to a longitudinal distance or to a longitudinal gap between the longitudinal position of the channel aperture of the fluid channel and the inside surface of the pierceable stopper may be easily compensated by a subsequent or simultaneous longitudinal displacement of the movable part relative to the adapter body. Once a desired longitudinal position of the channel aperture relative to the pierceable stopper has been reached, the movable part may be immobilized to the adapter body.

Immobilization of the movable part relative to the adapter body may be achieved in a number of different ways. With a threaded engagement between the movable part and the adapter body a respective fixing in longitudinal direction is immediately obtained by no longer applying a torque or rotating force to the movable part relative to the adapter body. In further examples the guiding receptacle of the adapter body and the base part of the movable part may be in frictional engagement. Here, a longitudinal displacement, e.g. a sliding displacement of the movable part relative to the adapter body may require application of a respective longitudinally directed force effect, which is larger than a predefined break loose force of the frictional engagement between the guiding receptacle and the movable part.

In further examples a longitudinal distal placement may be effectively prevented and the movable part may be fixed with regard to the longitudinal direction relative to the adapter body by making use of the above-described channel projection of the elongated fluid channel.

In another aspect the present disclosure also relates to an injection kit for administering a liquid medicament. The injection kit comprises an injection vial. The injection vial comprises a barrel to accommodate a liquid medicament or a liquid substance. The injection vial further comprises a barrel head with an outlet. The outlet is sealed by a pierceable stopper, such as a septum. The pierceable stopper comprises an inside surface delimiting or adjoining the inner cavity of the injection vial that is filled or provided with the liquid substance.

The injection kit further comprises a vial adapter as described above, which is configured for fastening to the barrel head of the injection vial. The vial adapter comprises a movable part with an elongated fluid channel, the movable part is longitudinally movable relative to an adapter body, wherein the adapter body is configured for a direct fastening or direct engagement with the barrel head. The movable part is adjustably movable in longitudinal direction relative to the adapter body in order to align the channel aperture of the fluid channel with the inside surface of the pierceable stopper. Then and when reaching a final assembly configuration, the vial adapter with the injection vial may be held or rotated in an upside-down configuration, wherein the pierceable stopper faces downwardly.

Since the channel aperture of the elongated fluid channel of the movable part of the vial adapter is aligned with the inside surface or flushes with the inside surface of the pierceable stopper, the entirety of the liquid substance, e.g., the liquid medicament can be withdrawn from the cavity of the injection vial. The entire content of the injection vial may be thus withdrawn through the fluid channel into a drug delivery device or some other storage device connected to the mechanical connector of the movable part of the vial adapter.

Insofar, and since the injection kit comprises a vial adapter as described above, all features, benefits and effects as described above in connection with the vial adapter equally apply to the injection kit; and vice versa.

According to a further example the injection kit comprises an injection device, which is configured for fastening to the mechanical connector of the movable part. The injection device is configured to withdraw the liquid medicament from an interior of the barrel through the fluid channel of the movable part of the vial adapter. The injection device may comprise a syringe.

In some examples of the vial adapter the mechanical connector comprises a standardized fluid transferring connector, such as a Luer connector. The injection device may comprise a complementary shaped standardized counter connector in order to establish a fluid transferring mutual connection between the injection device and the mechanical connector of the movable part of the vial adapter. In some examples the mechanical connector of the movable part comprises a conically-shaped receptacle to receive a complementary shaped conically-shaped protrusion of the injection device; or vice versa. The mechanical connector is in fluid transferring connection with the fluid channel. In some examples the fluid channel may merge in a receptacle of the mechanical connector or, which may be confined by a conically-shaped connector sidewall.

In another aspect the present disclosure also relates to a method of withdrawing a liquid substance, e.g., a liquid medicament, contained in an injection vial. The injection vial comprises a barrel and a barrel head with an outlet, wherein the outlet is sealed by a pierceable stopper and wherein the pierceable stopper comprises an inside surface. The method comprises steps of engaging a vial adapter with the barrel head of the injection vial and penetrating the pierceable stopper of the injection vial in a longitudinal distal direction thereby urging an elongated fluid channel of the vial adapter through the pierceable stopper. Thereafter or concurrently with penetrating the pierceable stopper the channel aperture of the elongated fluid channel is adjustably aligned with an inside surface or is arranged flush with the inside surface of the pierceable stopper by moving the movable part of the vial adapter relative to the base part of the vial adapter with respect to the longitudinal direction.

The vial adapter may comprise an adapter body and a movable part, wherein the movable part comprises the elongated fluid channel with the distal channel aperture. The movable part is movable relative to the adapter body along the longitudinal direction.

According to a further example the adapter body of the vial adapter may be engaged, fastened or fixed to the barrel head of the barrel of the injection vial without penetrating the pierceable stopper. Penetration of the pierceable stopper may be executed in a separate and/or subsequent step of moving or urging the movable part of the vial adapter relative to the adapter body in longitudinal direction, e.g., in longitudinal distal direction.

Simultaneously and/or subsequently it is conceivable that the movable part is adjustably moved relative to the adapter body in longitudinal distal direction or longitudinal proximal direction to align the channel aperture of the fluid channel of the movable part with the inside surface of the pierceable stopper of the injection vial. With an appropriate alignment between the inside surface of the pierceable stopper and the channel aperture of the fluid channel there can be provided an almost complete or entirely complete emptying of the injection vial.

Accordingly and in a further step, the liquid substance located inside the injection vial is completely or almost completely withdrawn from the interior of the injection vial via the channel aperture. For this, the elongated fluid channel may be connected with a pump device, e.g. with a syringe, configured to apply a negative pressure to the elongated fluid channel effective to withdraw the liquid substance from the interior of the injection vial.

In some examples the method is executable by making use of a vial adapter as described above. Insofar, all features, effects and benefits as described above in connection with the vial adapter equally apply to the method of withdrawing the liquid medicament contained in the injection vial; and vice versa.

In this way the vial adapter is used to individually adjust a longitudinal position of the channel aperture of the elongated fluid channel in such a way that the channel aperture flushes or it aligns with an inside facing surface of the pierceable stopper, which allows and supports an almost complete and/or almost restless emptying of the injection vial through the elongated fluid channel.

In a further aspect the present disclosure also relates to a method of administering an injectable medicament, the method comprising the steps of using a vial adapter for connecting to an injection vial, wherein the injection vial comprising a barrel and a barrel head with an outlet, wherein the outlet is sealed by a pierceable stopper and wherein the pierceable stopper comprises an inside surface. The vial adapter comprises an adapter body comprising a top wall and a sidewall, the side wall projecting from the top wall in a longitudinal direction to form a receptacle with a distal side of the top wall, wherein the receptacle is configured to receive at least a portion of the barrel head. The vial adapter further comprises a movable part comprising a base part and an elongated fluid channel extending through the top wall along the longitudinal direction. The elongated fluid channel comprises a proximal channel section merging into a mechanical connector and further comprises a distal channel section with a channel aperture, wherein the movable part is adjustably movable relative to the adapter body along the longitudinal direction to align the channel aperture with the inside surface of the pierceable stopper.

In some examples the method of administering the injectable medicament includes using of a vial adapter and/or of a vial as described above. Insofar, all features, effects and benefits as described above equally apply to the method of administering the injectable medicament.

In a further example the method of administering the injectable medicament comprises the step of connecting the vial adapter to the injection vial.

In a further example the method of administering the injectable medicament comprises the step of moving the movable part of the vial adapter relative to the adapter body along the longitudinal direction and aligning the channel aperture of the elongated fluid channel with the inside surface of the pierceable stopper. In some examples the movable part of the vial adapter is moved in longitudinal direction relative to the adapter body such that the channel aperture flushes with the inside surface of the pierceable stopper or slightly protrudes from the inside surface of the pierceable stopper. In this way, the entirety of a liquid substance or of a liquid medicament can be withdrawn from the interior of the barrel of the vial.

In the present context the terms proximal and distal are used to distinguish between opposite longitudinal direction with regard to a piercing direction along which the stopper of the injection vial can be or is to be penetrated. Here, the distal direction determines a direction along which the stopper is penetrable from outside and the proximal direction defines a direction along which the liquid substance can be withdrawn from the cavity of the injection vial.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrome.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, small modular immunopharmaceuticals (SMIP), binding-domain immunoglobulin fusion proteins, camelized antibodies, and immunoglobulin single variable domains. Additional examples of antigen-binding antibody fragments are known in the art.

The term "immunoglobulin single variable domain" (ISV), interchangeably used with "single variable domain", defines immunoglobulin molecules wherein the antigen binding site is present on, and formed by, a single immunoglobulin domain. As such, immunoglobulin single variable domains are capable of specifically binding to an epitope of the antigen without pairing with an additional immunoglobulin variable domain. The binding site of an immunoglobulin single variable domain is formed by a single heavy chain variable domain (VH domain or VHH domain) or a single light chain variable domain (VL domain). Hence, the antigen binding site of an immunoglobulin single variable domain is formed by no more than three CDRs.

An immunoglobulin single variable domain (ISV) can be a heavy chain ISV, such as a VH (derived from a conventional four-chain antibody), or VHH (derived from a heavy-chain antibody), including a camelized VH or humanized VHH. For example, the immunoglobulin single variable domain may be a (single) domain antibody, a "dAb" or dAb or a Nanobody® ISV (such as a VHH, including a humanized VHH or camelized VH) or a suitable fragment thereof. [Note: Nanobody® is a registered trademark of Ablynx N.V.]; other single variable domains, or any suitable fragment of any one thereof.

"VHH domains", also known as VHHs, VHH antibody fragments, and VHH antibodies, have originally been described as the antigen binding immunoglobulin variable domain of "heavy chain antibodies" (i.e., of "antibodies devoid of light chains"; Hamers-Casterman et al. 1993 (Nature 363: 446-448). The term "VHH domain" has been chosen in order to distinguish these variable domains from the heavy chain variable domains that are present in conventional 4-chain antibodies (which are referred to herein as "VH domains") and from the light chain variable domains that are present in conventional 4-chain antibodies (which are referred to herein as "VL domains"). For a further description of VHH's, reference is made to the review article by Muyldermans 2001 (Reviews in Molecular Biotechnology 74: 277-302).

For the term "dAb's" and "domain antibody", reference is for example made to Ward et al. 1989 (Nature 341: 544), to Holt et al. 2003 (Trends Biotechnol. 21: 484); as well as to WO 2004/058820, WO 2006/030220, WO 2006/003388. It should also be noted that, although less preferred in the context of the present invention because they are not of mammalian origin, single variable domains can be derived from certain species of shark (for example, the so-called "IgNAR domains", see for example WO 2005/18629).

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

In some examples the injection vial is filled or provided with a liquid medicament used in gene therapy for ophthalmic application. Such medicaments may have to be administered in rather small doses, e.g. comprising only a few µl. In addition, such medicaments might be rather costly and should therefore be used entirely.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

BRIEF DESCRIPTION OF THE FIGURES

In the following, numerous examples of a vial adapter configured for fastening to an injection vial as well as an injection kit comprising such a vial adapter will become apparent in greater detail by making reference to the drawings, in which.

DETAILED DESCRIPTION

Figure 1:
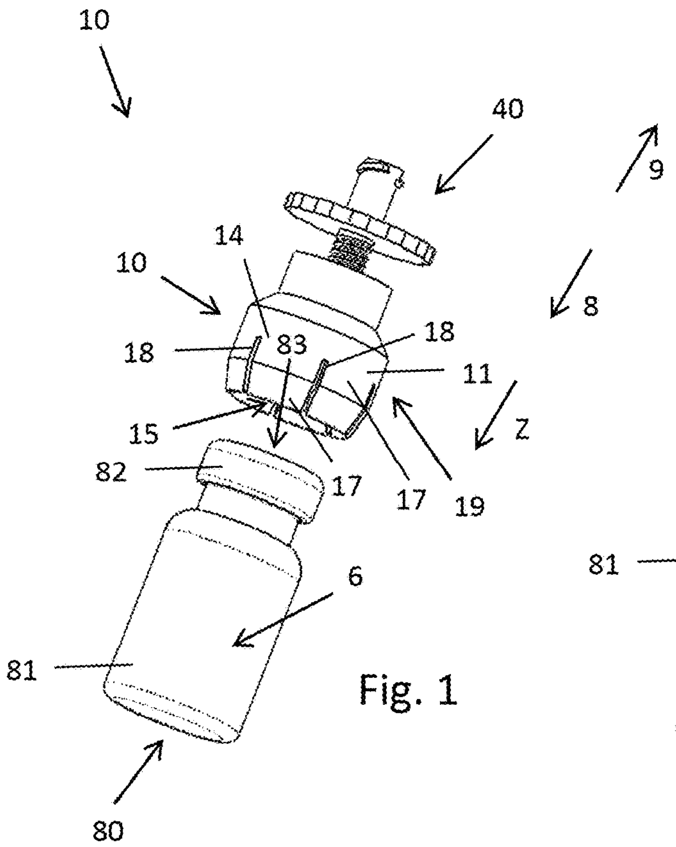
FIG. 1 schematically illustrates a vial adapter before connecting to an injection vial.

FIGS. 1-25 illustrate numerous examples of a vial adapter 10, which is configured for fastening or engaging with an injection vial 80. The vial adapter 10 fastened or connected to the injection vial 80 may form or constitute an injection kit 100 for administering a liquid substance such as a liquid medicament 6. The injection vial 80 comprises a barrel 81, e.g., of tubular shape. The barrel 81 may comprise a radially stepped down barrel head 82 towards a proximal or upper end. The barrel head 82 comprises or forms an outlet 83, through which a liquid content located inside the cavity 86 of the injection vial 80 can be withdrawn. The outlet 83 is sealed by a pierceable stopper 84. The stopper 84 may comprise a pierceable septum made of a thermoplastic material or elastomeric material, such as bromobutyl rubber. The stopper 84 may be attached and/or fixed to the outlet 83 by way of a crimped cap 87, e.g. made of metal.

The vial adapter 10 comprises an adapter body 11 and a movable part 40, which is longitudinally displaceable relative to the adapter body 11. As particularly shown in FIGS. 1-4 the adapter body 11 comprises a top wall 12 and a sidewall 14 projecting from an outer edge or outer circumference of the top wall 12 in a longitudinal direction (z) to form a receptacle 15 with a distal side 13 of the top wall 12. Hence, the top wall 12 comprises a distal side 13, e.g. facing in a distal direction 8 comprises an opposite side, e.g. a proximal side 16 facing in proximal direction 9.

In some examples the injection kit 100 is pre-assembled, such that the vial adapter 10 is already fixed to the injection vial 80. In such a pre-assembly configuration the adapter body 11 of the vial adapter 10 may be fastened or fixed to the barrel head 82 of the injection vial 80. In this initial configuration it may be further provided that the movable part 40 is initially in a proximal position, in which the movable part 40 is located outside the pierceable stopper 84. In the pre-assembly configuration it may be then only required that the movable part 40 is moved in the distal direction relative to the adapter body 11 so as to pierce and/or to penetrate the pierceable stopper 84.

In other examples, the injection kit 100 comprises the injection vial 80 and the vial adapter 10 as described herein, wherein the vial adapter 10 is wrapped or packaged separately from the injection vial 80. Here, a user equipped with the injection kit 100 may be then initially obliged to connect the adapter body 11 of the vial adapter 10 to the barrel head 82 of the injection vial 80. Thereafter, or concurrent with a fastening of the adapter body 11 to the barrel head 82 the movable part 40 may be subject to a movement in longitudinal direction relative to the adapter body 11 so as to pierce and/or to penetrate the pierceable stopper 84.

In the example of FIGS. 1-6 the sidewall 14 of the adapter body 11 comprises numerous resiliently deformable sidewall segments 17 that are separated by elongated slits 18 extending in longitudinal distal direction 8. The slits 18 adjoin a distal end of the sidewall 14 such that respective distal ends of the sidewall segments 17 are allowed to flex in radial direction, i.e. perpendicular to the longitudinal direction (z).

Specifically, the distal ends of the sidewall segments 17 form a skirt 19, which is configured to engage with the barrel head 82 of the injection vial 80. As it is particularly shown in the cross-section of FIG. 4 on an inside surface near the distal end of the sidewall segments 17 there are provided radially inwardly protruding snap features 17*a*, which adjoin a distally facing beveled section 17*b*, which upon a sliding engagement with the barrel head 82 are configured to induce a laterally or radially outwardly directed flexing motion of the individual sidewall segments 17 until the barrel head 82 reaches a final assembly position inside the receptacle 15.

When reaching a final assembly configuration the sidewall segments 17 and their snap features 17*a* engage with an undercut or recessed section of the barrel head 82 to form a form fitting longitudinal fastening or fixing of the vial adapter 10 to the injection vial 80.

The movable part 40 of the vial adapter 10 comprises a base part 41 and an elongated fluid channel 50, which is long enough to extend through the top wall 12 of the adapter body 11 along the longitudinal direction (z). The fluid channel 50 comprises a proximal channel section 52 merging into a mechanical connector 70. The fluid channel 50 further comprises a distal channel section 51 with a channel aperture 53.

Figure 5:
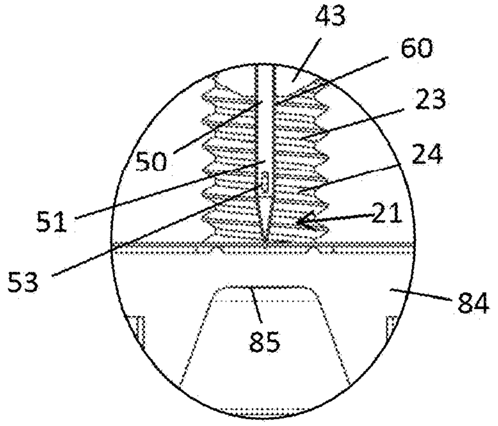
FIG. 5 is an enlarged view of a section of FIG. 4.
Figure 6:
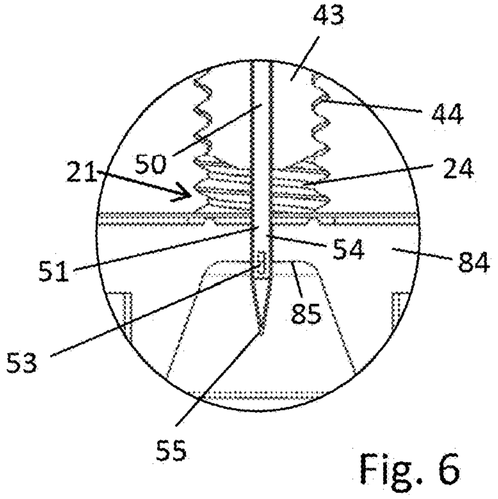
FIG. 6 shows an enlarged view of a further configuration of the vial adapter, when the movable part is moved distally compared to the configuration of FIG. 5.
Figure 7:
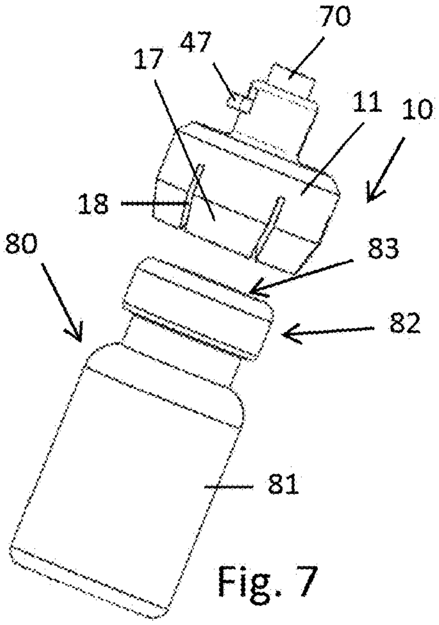
FIG. 7 shows a further example of a vial adapter before fastening to an injection vial.
Figure 8:
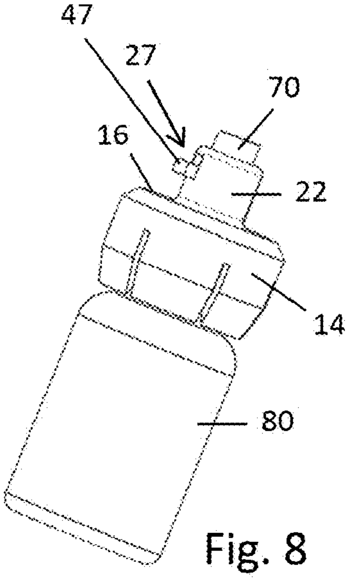
FIG. 8 shows the vial adapter according to FIG. 7 attached to the vial.
Figure 9:
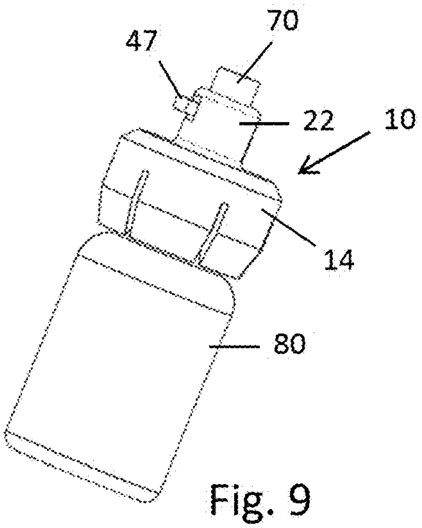
FIG. 9 shows the vial adapter according to FIG. 8 with the movable part being moved compared to the configuration of FIG. 8.

The movable part 40 is adjustably movable relative to the adapter body 11 along the longitudinal direction (z) in order to align the channel aperture 53 with an inside surface 85 of the pierceable stopper 84 as illustrated in FIGS. 5 and 6. In the enlarged illustration of FIG. 5, in which the adapter body 11 is fixed to the injection vial 80, the distal end of the fluid channel 50, hence the distal channel section 51 is located proximally from the pierceable stopper 84. In this configuration the elongated fluid channel 50 is located proximally and hence outside the pierceable stopper 84. The pierceable stopper 84 is unpierced and is hence still intact.

It may be only upon a distally directed movement of the movable part 40 relative to the adapter body 11 that the fluid channel 50 penetrates the pierceable stopper 84 to such an extent that the channel aperture 53 enters the cavity 86 of the vial 80 and aligns with the inside surface 85 of the pierceable stopper 84 as shown in FIG. 6.

Specifically, the movable part 40 is adjustably movable relative to the adapter body 11 to reach an alignment configuration of the channel aperture 53 with the inside surface 85 of the pierceable stopper 84 as shown in FIG. 6. The adjustable displacement of the movable part 40 relative to the adapter body 11 allows and supports a complete or nearly complete withdrawal of the liquid substance from an interior volume of the cavity 86 of the injection vial 80. Moreover, and by way of the individually adjustable longitudinal displacement of the movable part 40 relative to the adapter body 11 there can be provided an effective compensation of manufacturing tolerances and/or assembly tolerances of the injection vial 80 and the vial adapter 10 or their mutual assembly.

By adjusting the longitudinal position of the movable part 40 relative to the adapter body 11 a number of different longitudinal positions of the movable part 40 relative to the adapter body 11 can be obtained. In any one of these available longitudinal positions the movable part 40 may be immobilized relative to the adapter body 11 so as to maintain the alignment position of the channel aperture 53 with the inside surface 85 of the pierceable stopper 84.

In the example of FIGS. 1-6 the elongated fluid channel 50 is provided inside an elongated cannula 54 comprising a rather stiff and compression resistant channel sidewall 60. As it is immediately apparent from FIGS. 4-6 the cannula 54 may extend through the base part 41 of the movable part 40. Here, the base part 41 comprises an insert 43, which is longitudinally displaceable in a guiding structure 20, specifically in a guiding receptacle 21 of the adapter body 11. In the example of FIGS. 1-6 the base part 41 comprises an outer base part sidewall 42 with an outside surface that is complementary shaped to an inside surface of a receptacle sidewall 22 of the guiding receptacle 21 of the adapter body 11.

In the illustrated embodiment the receptacle sidewall 22 and the base part sidewall 42 are threadedly engaged. In this way and by inducing a rotation or a torque onto the movable part 40 relative to the adapter body 11 there is generated a longitudinal displacement of the movable part 40 relative to the adapter body the 11.

For inducing such a torque the movable part 40 comprises a radially widened flange portion 75 protruding radially outwardly from the somewhat cylindrically-shaped sidewall 42 of the base part 41. The flange portion 75 is located at a longitudinal proximal distance from the channel aperture 53. The radially widened flange portion 75 may comprise a disc-shaped structure. It may comprise a gripping surface 76 at a radial outer edge, which facilitates a slip free gripping and introduction of an angular momentum or torque through a user.

The base part sidewall 42 is provided with an outer threaded section 44, which is in engagement with the inner threaded section 24 of the receptacle sidewall 22. In this way and by inducing a rotation of the movable part 40 there is generated a longitudinal displacement by way of which the longitudinal position of the channel aperture 53 with respect to the pierceable stopper 84 can be individually and precisely adjusted.

The threaded engagement via the threaded sections 24, 44 further provides an inherent longitudinal fixing of the movable part 40 to the adapter body 11. In the absence of a torque the movable part 40 is immediately longitudinally fixed to the adapter body 11 and the alignment configuration of the channel aperture 53 with the inside surface 85 of the pierceable stopper 84 can be fixed and maintained. In this configuration, as e.g. shown in FIG. 6, the entire assembly of vial adapter 10 and injection vial 80, may be oriented upside-down to withdraw the liquid content or medicament 6 from the cavity 86 of the injection vial 80. Since the channel aperture 53 is flush or is aligned with the inside surface 85 of the pierceable stopper 84 the entirety of the liquid substance can be withdrawn from the cavity 86 of the injection vial 80.

The adapter body 11 comprises the guiding receptacle 21, which may protrude proximally with its receptacle sidewall 22 from the proximal side 16 of the top wall 12.

The guiding receptacle 21 may comprise a longitudinal through bore 23, which in the example of FIGS. 1-6 is provided with an inner threaded section 24.

Figure 18:
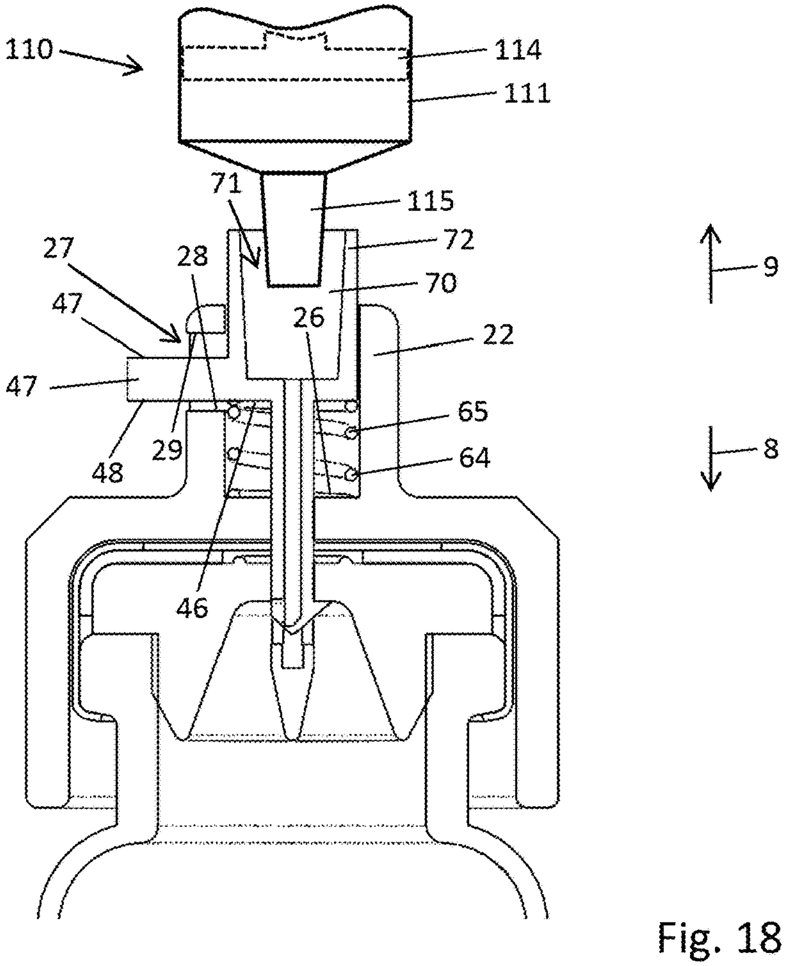
FIG. 18 is a cross-section through a further example of a vial adapter fastened to the injection vial.
Figure 19:
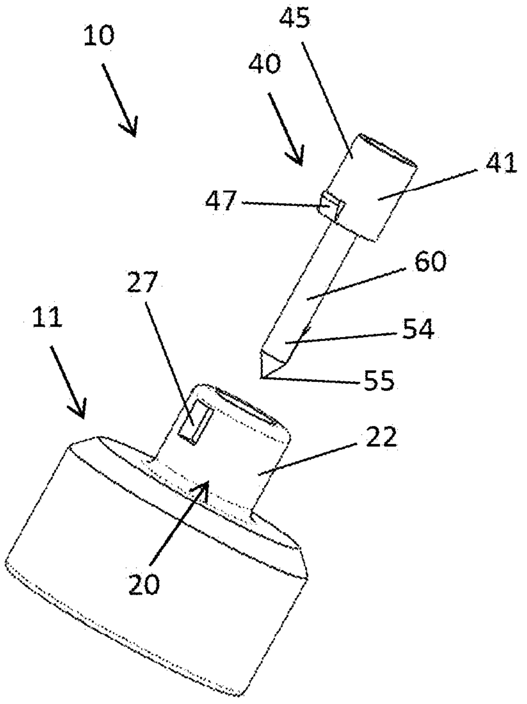
FIG. 19 shows a further example of a vial adapter according to a first perspective.
Figure 20:
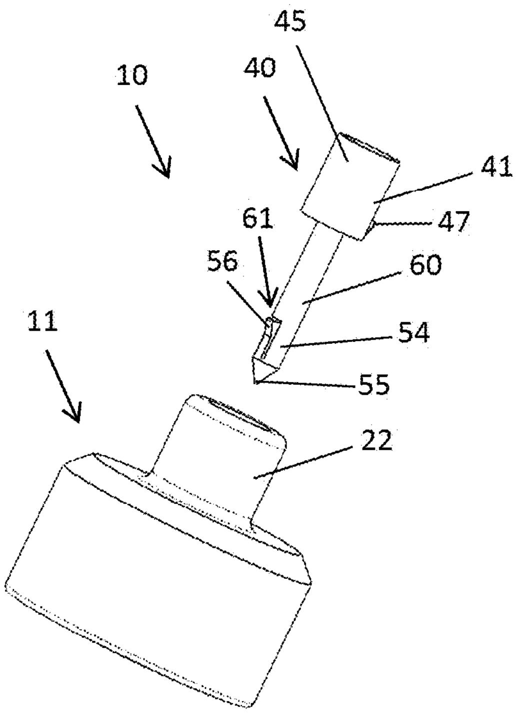
FIG. 20 shows another perspective illustration of the vial adapter according to FIG. 19.

The movable part 40 is provided with a mechanical connector 70 at its proximal end, which allows for a liquid transferring coupling or fastening with an injection device 110 as e.g. shown in FIG. 18. The mechanical connector 70 comprises a connector sidewall 72 confining a connector receptacle 71. The connector receptacle 71 may be in direct fluid communication with the proximal channel section 52. The connector sidewall 72 may comprise a tapered structure, e.g. configured to engage in a liquid tight or liquid transferring manner with a complementary shaped counter connector 115 of an injection device 110, such as a syringe 111.

The injection device 110 may comprise a syringe barrel 112 in which a plunger 114 is longitudinally movable. The syringe barrel 112 may terminate in distal direction by the counter connector 115, e.g. implemented as a Luer-type connector and configured to mechanically engage with the inside of the connector sidewall 72 of the mechanical connector 70.

Figure 2:
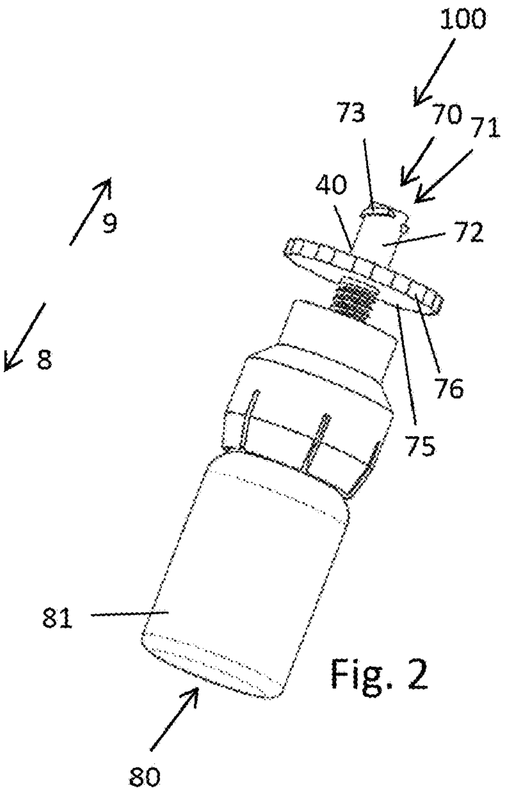
FIG. 2 shows the vial adapter according to FIG. 1 attached to the injection vial and with a movable part in an initial configuration.
Figure 3:
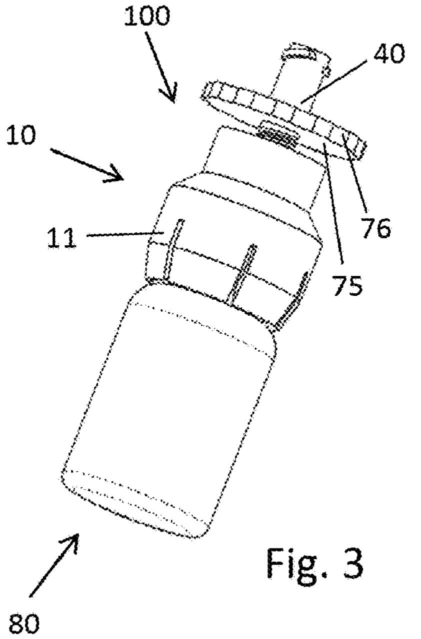
FIG. 3 shows the vial adapter and hence the injection kit of FIG. 2 with the movable part of the vial adapter in a distal end position.
Figure 4:
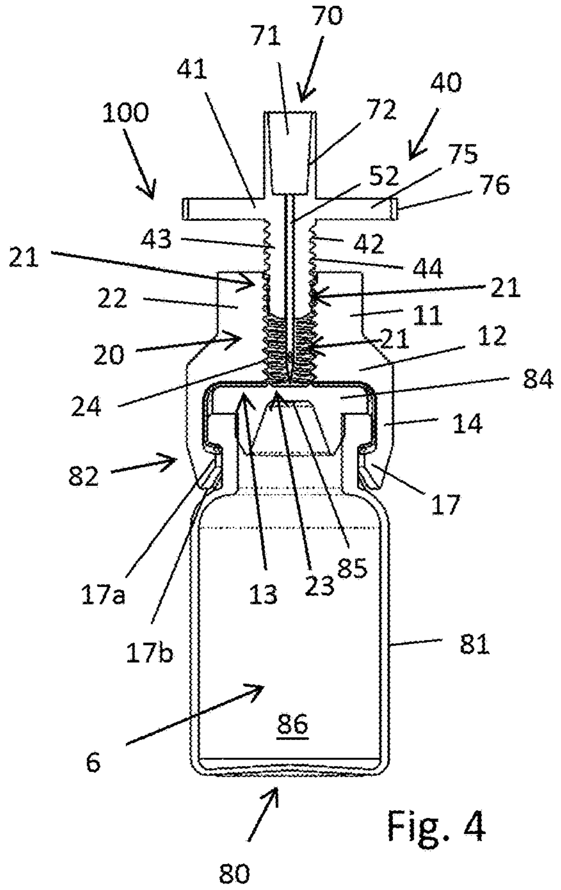
FIG. 4 is a cross-section through the vial adapter and the injection kit according to FIG. 2.

Optionally, the mechanical connector 70 may be provided with a mechanical fastening structure 73 as indicated in FIG. 2. The fastening structure 73 may comprise a threaded portion or threaded section to engage with a complementary shaped counter threaded portion of the injection device 110.

In a further example as shown in FIGS. 7-15 only the adapter body 11 and its engagement with the movable part 40 is slightly modified compared to the example according to FIGS. 1-6. The general working principle is implemented in a like or somewhat identical manner.

Here, the adapter body 11 comprises a receptacle sidewall 22 protruding proximally from a rather planar-shaped proximal side 16 of the receptacle 15. The receptacle sidewall 22 is of cylindrical shape and protrudes from a transverse midsection of the proximal side 16 of the adapter body 11. The receptacle sidewall 22 may be provided with an inside facing gliding surface 25 to slidably engage with a complementary shaped outside facing gliding surface 45 of the movable part 40. The gliding surface 45 and the gliding surface 25 may be of cylindrical shape to enable a smooth longitudinal sliding or gliding motion of the movable part 40 relative to the adapter body 11.

As it is particularly shown in FIGS. 7-15 the receptacle sidewall 22 is provided with an elongated through recess 27 extending in longitudinal direction. The through recess 27 is delimited in distal direction by a distal stop face 28 and is delimited in proximal direction by a proximal stop face 29. The movable part 40, in particular its base part 41 comprises a lateral projection 47 extending laterally or radially through the through recess 27.

Figure 11:
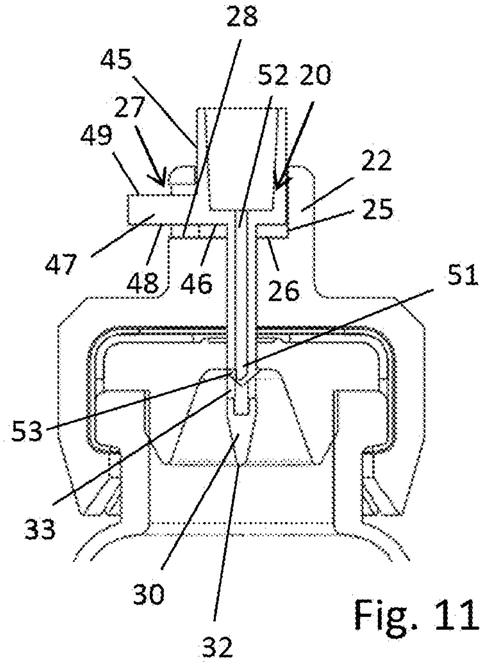
FIG. 11 shows a cross-section through the vial adapter in the configuration of FIG. 9.

As shown in FIG. 11 the lateral projection 47 comprises a distally facing stop face 48 and a proximally facing stop face 49 to make a respective distally or proximally directed contact with the oppositely located with the stop faces 28, 29 of the through recess 27, respectively. In this way there is provided a limited longitudinal displacement of the movable part 40 relative to the adapter body 11, which is sufficient to compensate for any manufacturing tolerances or assembly tolerances and which is large enough to obtain or to arrive in an alignment configuration of the channel aperture 53 with the inside surface 85 of the pierceable stopper 84.

The lateral projection 47, in particular that portion thereof that protrudes radially outwardly from an outside surface of the receptacle sidewall 22, may serve as a handle allowing a user to manually induce a longitudinal displacement of the movable part 40 relative to the adapter body 11. Here, the gliding surfaces 25, 45 may be in frictional engagement, such that a longitudinally directed displacement of the movable part 40 relative to the adapter body 11 requires application of a respective movement force above a well-defined or pre-defined break-loose force of the frictional engagement.

Figure 10:
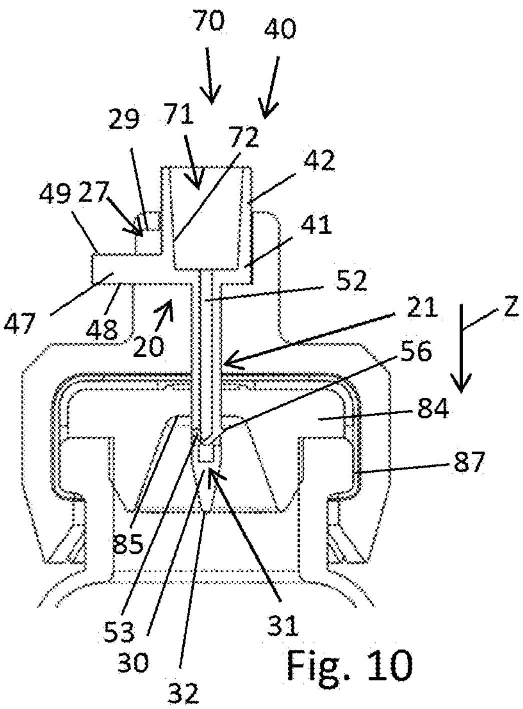
FIG. 10 shows an enlarged cross-section through the vial adapter in the configuration of FIG. 8.

As it is further apparent from FIG. 11 the guiding receptacle 21 may be delimited in distal direction by a bottom 26. The movable part 40, specifically its base part 41 comprises a complementary shaped abutment face 46 facing in distal direction 8. In the configuration of FIG. 10 the abutment face 46 of the movable part 40 is in longitudinal abutment with the bottom 26. In the configuration of FIG. 11 the movable part 40 has been displaced in proximal direction 9 relative to the guiding receptacle 21. Thus, there is obtained a gap between the abutment face 46 and the bottom 26.

In the example of FIGS. 7-15 the elongated fluid channel 50 comprises an elongated channel sidewall 60 which is provided with a radially outwardly extending channel projection 56. The channel projection 56 is provided with a proximally facing abutment face 57, which in the configuration of FIGS. 10 and 12 faces towards the inside surface 85 of the pierceable stopper 84 in an initial configuration, in which the adapter body 11 is duly attached, e.g. snap fitted onto the barrel head 82. In this initial configuration there may be provided a longitudinal gap between the channel aperture 53 and the inside surface 85 of the pierceable stopper 84.

Now and by moving the movable part 40 upwardly, i.e. in proximal direction 9 the channel projection 56 is moved accordingly until its abutment face 57 gets in longitudinal abutment with the inside surface 85 of the pierceable stopper 84. This configuration is schematically illustrated in FIG. 11. The abutment face 57 and hence the channel projection 56 may be then longitudinally aligned with the channel aperture 53. In this way it can be provided that the channel aperture 53 correctly and precisely aligns with the inside surface 85 of the pierceable stopper 84 as soon as an abutment configuration between the abutment face 57 and the inside surface 85 of the pierceable stopper 84 has been reached.

Figure 12:
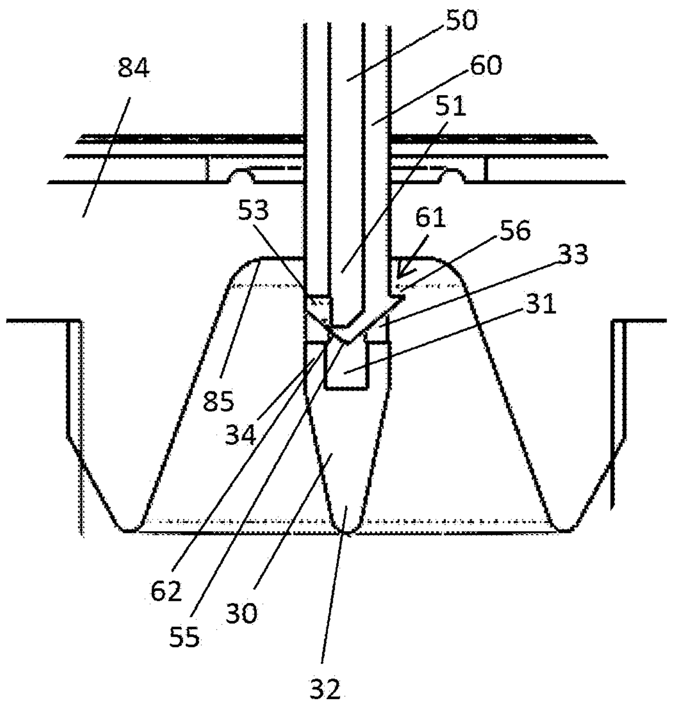
FIG. 12 is an enlarged sectional view of the cross-section of FIG. 10.
Figure 13:
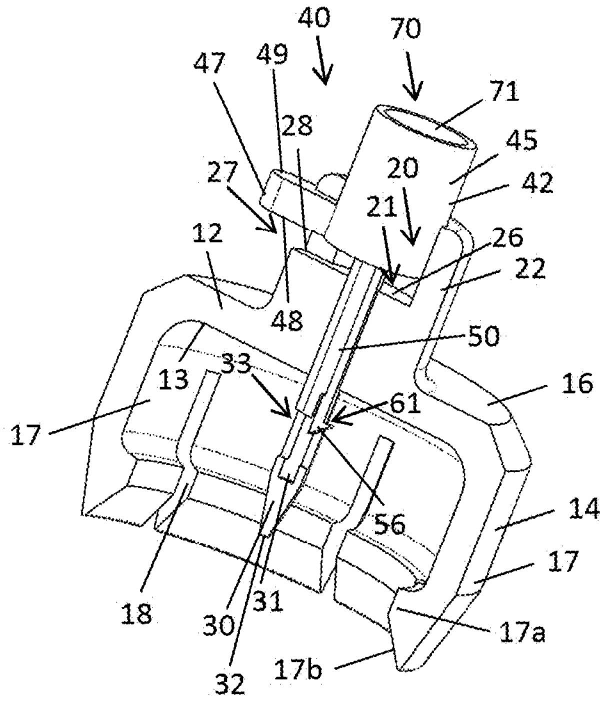
FIG. 13 is a partially cut perspective illustration of the vial adapter according to FIGS. 10 and 11.

In the example according to FIGS. 7-15 the adapter body 11 is further provided with a spike 30 protruding in distal direction 8 from the distal side 13 of the top wall 12 of the adapter body 11. The spike 30 comprises an elongated spike channel 31 and a tipped end 32. The spike 30 provides a longitudinal guide for the fluid channel 50 and hence for the channel sidewall 60. As it is best shown in FIG. 13 the spike 30 comprises an elongated spike channel sidewall 34, which comprises at least one elongated slit 33, through which the channel projection 56 of the fluid channel 50 extends. Also, the channel aperture 53 may align or overlap with the elongated slit 33 of the spike 30.

Figure 14:
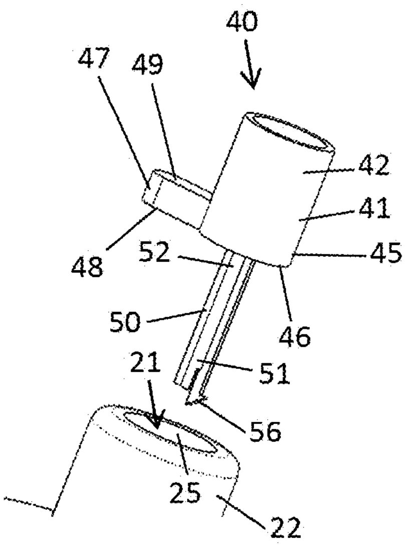
FIG. 14 shows the movable part of the vial adapter.
Figure 15:
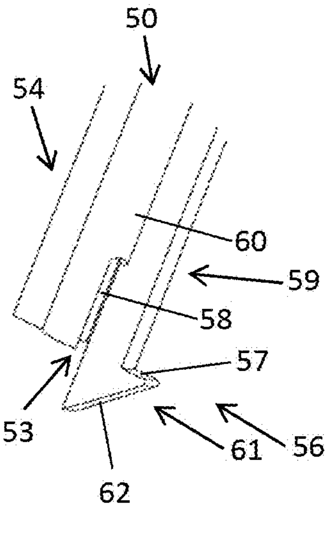
FIG. 15 shows the distal end of the movable part of the vial adapter according to FIG. 14.

In the example of FIG. 12 the fluid channel 50 and hence the channel sidewall 60 terminates in distal direction by a tipped end 55, which is provided with a beveled section 62 directly merging into the channel projection 56. In the further example as shown in FIGS. 13-15 and when the fluid channel 52 and its channel sidewall 60 is longitudinally guided inside the spike channel 31 the fluid channel 50 and hence the channel sidewall 60 may no longer require a tipped end. Here, the distal end of the distal channel section 51 of the fluid channel 50 may be open and the distal channel section 51 may be only provided with at least one laterally protruding channel projection 56.

Generally, the channel projection 56 may comprise or may constitute a barb 61 or a bar feature, which is elastically deformable in order to facilitate penetration through the pierceable stopper 84.

In some examples and as will be described in greater detail with the example of FIGS. 19-25 the channel projection 56 may comprise or may be formed by a radially deformable or by a radially flexible tongue 59.

Figure 16:
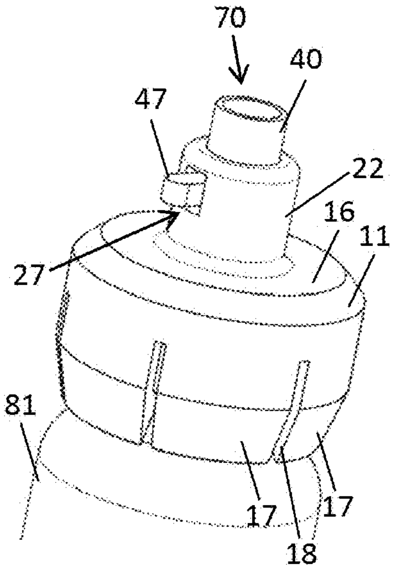
FIG. 16 shows a further example of a vial adapter when fastened to the injection vial.
Figure 17:
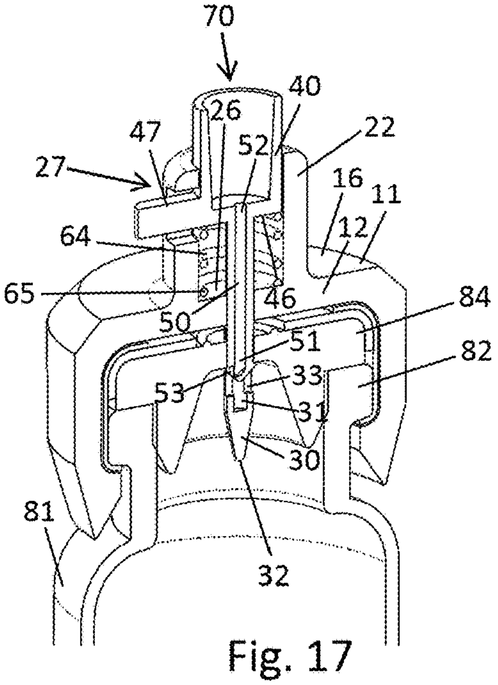
FIG. 17 is a perspective illustration of a cross-section of the vial adapter fastened to the injection vial.

In the example of FIGS. 16-18 there is provided a biasing element 64 between the distally facing abutment face 46 and the proximally facing bottom 26. The biasing element 64 comprises a helical spring 65, which is in longitudinal abutment with the oppositely facing bottom 26 and the abutment face 46, respectively. The spring 65 serves to urge the movable part 40 upwardly, hence in proximal direction 9. In an initial configuration and before the vial adapter 10 is mounted or fastened to an injection vial 80 the spring 65 biases the movable part 40 in proximal direction 9 such that the proximally facing stop face 49 of the lateral projection 47 is in longitudinal abutment with the distally facing stop face 29 of the through recess 27 of the receptacle sidewall 22.

Upon establishing a connection with the injection vial 80 or upon engaging the receptacle 15 of the adapter body 11 with the injection vial 80 the fluid channel 50 and in particular the channel aperture 53 may be initially located at a longitudinal distance from the inside surface 85 of the pierceable stopper 84, e.g., in a way as illustrated in FIG. 12. Now and under the effect of the biasing element 64, the movable part 40 experiences a proximally directed force effect provided of which the movable part 40 is moved in proximal direction until the channel projection 56 of the fluid channel 50 engages with the inside surface 85 of the pierceable stopper 84. The respective abutment configuration is apparent from FIG. 18.

In a further example as shown in FIGS. 19-25 the vial adapter 10 may be void of a spike 30 that is attached or that is unitarily formed with the adapter body 11. Rather, a spike may be provided by or formed by a cannula 54 that may be integrally formed with the base part 41 or which may rigidly, i.e. immovably attached to base part 41. The base part 41 may be in a sliding engagement with the guiding receptacle 21 and hence with the inside of the receptacle sidewall 22. Also here, the receptacle sidewall 22 comprises a through recess 27 into which a projection 47 of the base part 41 may extend.

Figure 22:
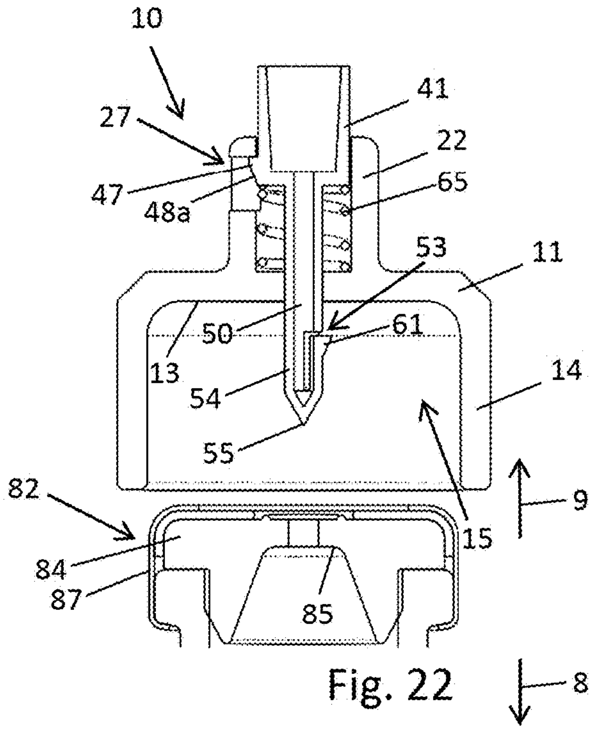
FIG. 22 shows a first stage of assembly of the vial adapter to the injection vial.

As it becomes apparent from FIG. 22 the lateral projection 47 may comprise a proximally facing stop face 49 to abut with the distally facing and proximally located stop face 29 of the through recess 27. Towards the distal direction 8 the lateral projection 47 may comprise a beveled section 48*a*, which may facilitate an initial insertion of the base part 41 into the guiding receptacle 21 along the distal direction 8.

The fluid channel 50 with its channel sidewall 60 may protrude distally from the cylindrically-shaped gliding surface 45. The gliding surface 45 and hence the sidewall 42 of the proximal part of the base part 41 comprises a larger diameter than the elongated channel sidewall 60. Towards or near a distal end of the channel sidewall 60 there is provided a barb 61, which is formed or constituted by the channel projection 56 as described above.

Figure 21:
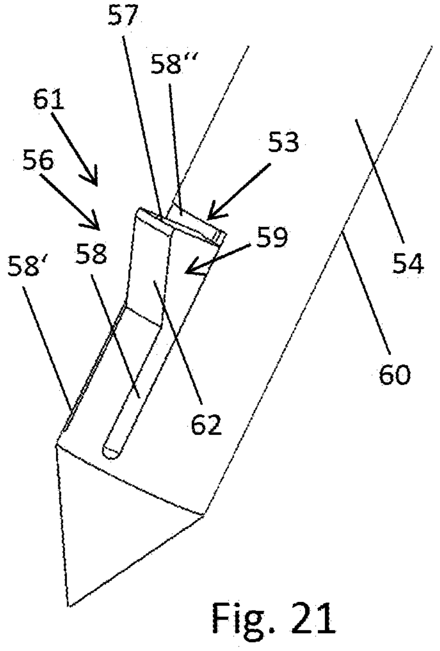
FIG. 21 is an enlarged view of a detailed at the distal end of the movable part of the vial adapter according to FIGS. 19 and 20.

Here and as shown in greater detail in FIG. 21 the channel projection 56 is formed as a part of a flexible tongue 59, which is unitarily shaped with the channel sidewall 60. As seen in circumferential direction an outside of the distal part of the tongue 59 is substantially flush with the outside circumference of the circumferentially adjoining portions of the channel sidewall 60. The tongue 59 may be separated from the channel sidewall by U-shaped slit comprising two parallel slits sections 58, 58" and a further slit section 58' mutually connecting the proximal end of the parallel slits 58, 58'.

In this way there is formed a radially or transversely deflectable tongue 59, which further provides of which further comprises a radially outwardly extending beveled section 62 towards its proximal end. The proximal end the tongue 59 comprises a proximally facing abutment face 57 to engage with or to abut with the inside surface 85 of the pierceable stopper 84.

The slits 58, 58', 58" and/or their through recesses extending through the sidewall 60 may form or constitute the channel aperture 53 to enable a fluid flow through the channel sidewall 60 into the fluid channel 50, which is confined by the channel sidewall 60. The beveled section 62 provides a radially inwardly directed flexing of the entire tongue 59 as the cannula 54 is urged in distal direction 8 through the pierceable stopper 84. For this, the cannula 54 comprises a tipped end 55.

Figure 23:
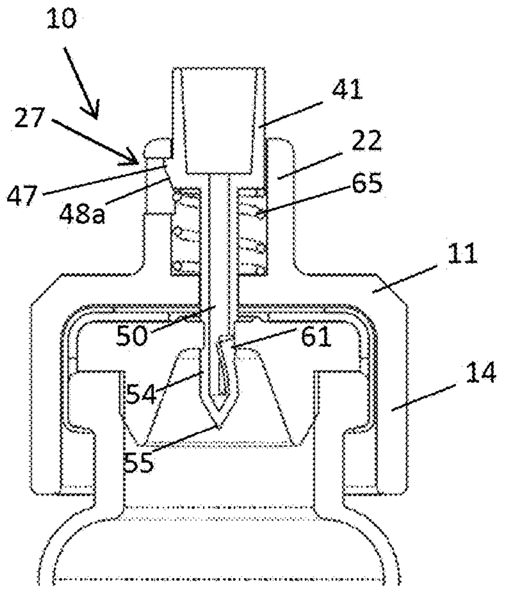
FIG. 23 shows a second stage of assembly of the vial adapter to the injection vial.
Figure 24:
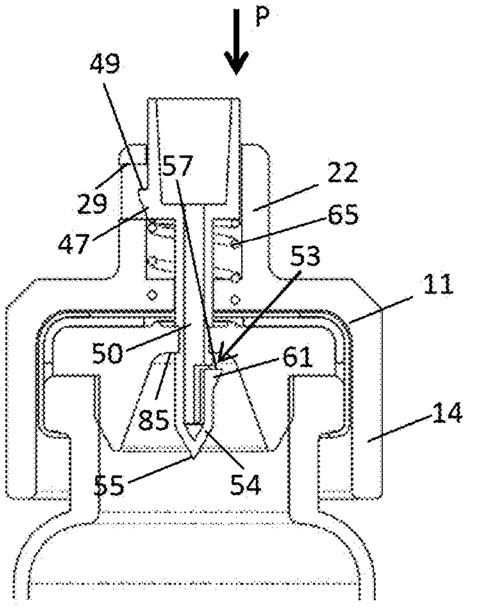
FIG. 24 shows an initial configuration of the movable part of the vial adapter and FIG. 25 shows a final assembly position or final configuration of the vial adapter after fastening to the injection vial.

When the adapter body 11 reaches an engagement or fastening configuration with the barrel head 82, such as illustrated in FIG. 23, the beveled section 62 and hence the abutment face 57 may not yet have entirely penetrated the pierceable stopper 84. Here and by applying a distally directed pressure P onto the movable part 40 the movable part 40 may be urged against the action of the biasing element 64 in distal direction 8 to reach a configuration as shown in FIG. 24. Here, the tongue 59 and the entire channel projection 56 have passed through the pierceable stopper 84 and have reached a configuration where the abutment face 57 and hence the channel aperture 53 is located at a longitudinal distance from the inside surface 85 of the pierceable stopper 84 and inside the cavity 86.

Figure 25:
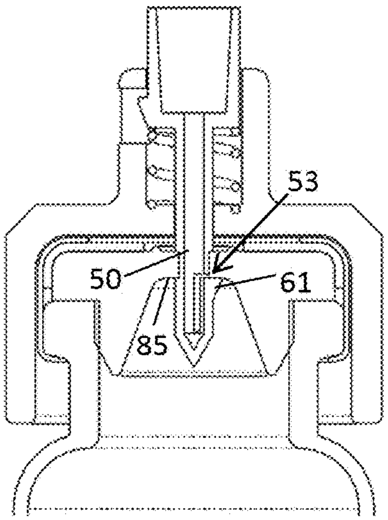

Upon release of the movable part 40 the biasing element 64 serves to apply a proximally directed pressure or driving force onto the movable part 40, which under the effect of the relaxing biasing element 64 starts to move in proximal direction 9 until this movement is delimited or stopped by an abutment of the abutment face 57 with the inside surface 85 of the pierceable stopper 84 as shown in FIG. 25.

In this final configuration the channel aperture 53 is in perfect alignment with the inside surface 85 of the pierceable stopper 84. Now, and with an injection device 110 duly attached to the mechanical connector 70 the entire injection kit 100 comprising the vial adapter 10 and the injection vial 80 can be flipped or oriented upside-down by way of which the entirety of a liquid content, e.g. of a liquid medicament 6 located in the cavity 86 of the barrel 81 of the injection vial 80 can be withdrawn through the channel aperture 53 into and through the fluid channel 50 towards the mechanical connector 70 and into the injection device 110.

Figure 26:
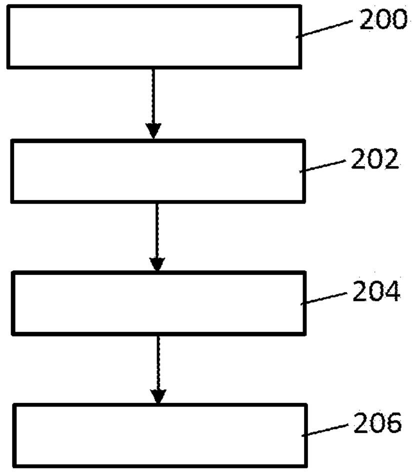
FIG. 26 is a flowchart of a method of withdrawing a liquid medicament contained in an injection vial.

In FIG. 26 the individual steps of using the vial adapter 10 or the injection kit 100 as described herein for withdrawing a liquid medicament contained in an injection vial 80 are schematically described.

In a first step 200 a vial adapter 10 as described herein is attached to a barrel head 82 of an injection vial 80. Concurrently with the engagement of the vial adapter 10 with the barrel head 82 or thereafter in step 202 the pierceable stopper 84 is penetrated in longitudinal distal direction by a cannula 54 or spike 30 by way of which the fluid channel 50 of the vial adapter may reach through the stopper 84. Penetration of the pierceable stopper 84 may be provided by a cannula 54 and/or by a spike 30 providing a longitudinal guiding for the fluid channel 50.

Thereafter and in step 204 the channel aperture 53 of the fluid channel 50 is aligned with the inside surface 85 of the pierceable stopper 84 by adjustably moving the movable part 40 of the vial adapter 10 relative to the adapter body 11 with regard to the longitudinal direction (z). This may be obtained in a variety of different ways, e.g. by a rotation of the movable part 40 relative to the adapter body 11 and with a threaded engagement of the movable part 40 and the adapter body 11 as shown with the example of FIGS. 1-6. Alternatively, the longitudinal adjusting movement of the channel aperture 53 relative to the adapter body 11 and/or relative to the pierceable stopper 84 can be obtained by a longitudinal sliding or gliding displacement of the movable part 40 relative to the adapter body 11, which may be even assisted or supported or even entirely governed by a biasing element 64 as described above. Thereafter, in an optional step 206 the vial adapter 10, which may be in a fluid transferring connection with the injection device 110 may be flipped upside down for withdrawal of the entirety of the liquid medicament 6 contained inside the cavity 86 of the barrel 81 of the injection vial 80. In this way, restless emptying of the injection vial 80 can be achieved.

The invention claimed is:

1. A vial adapter for connecting to an injection vial, the injection vial comprising a barrel and a barrel head with an outlet, wherein the outlet is sealed by a pierceable stopper and wherein the pierceable stopper comprises an inside surface, the vial adapter comprising:

an adapter body comprising a top wall and a sidewall, the sidewall projecting from the top wall in a longitudinal direction to form a receptacle with a distal side of the top wall, wherein the receptacle is configured to receive at least a portion of the barrel head; and a movable part comprising a base part and an elongated fluid channel extending through the top wall along the longitudinal direction, the elongated fluid channel comprising a proximal channel section merging into a mechanical connector and comprising a distal channel section with a channel aperture, wherein the movable part is adjustably movable relative to the adapter body along the longitudinal direction to align the channel aperture with the inside surface of the pierceable stopper, wherein when the channel aperture is aligned with the inside surface of the pierceable stopper, the channel aperture is flush with a distally-facing side of the inside surface, and wherein the elongated fluid channel comprises an elongated channel sidewall and a channel projection, the channel projection (i) is longitudinally aligned with the channel aperture, (ii) comprises a proximally facing abutment face configured to abut the inside surface of the pierceable stopper, (iii) extends laterally from the elongated fluid channel, and (iv) protrudes laterally from the elongated channel sidewall.

2. The vial adapter according to claim 1, wherein the adapter body comprises a longitudinally extending guiding structure with a guiding receptacle, in which the movable part is movably guided in the longitudinal direction.

3. The vial adapter according to claim 2, wherein the guiding receptacle comprises a receptacle sidewall and wherein the base part of the movable part comprises a base part sidewall with an outside surface, wherein at least one section of the outside surface is complementary shaped to the receptacle sidewall.

4. The vial adapter according to claim 2, wherein the base part of the movable part is in longitudinal sliding engagement with the guiding receptacle.

5. The vial adapter according to claim 3, wherein the receptacle sidewall comprises a through recess, and wherein the movable part comprises a lateral projection extending radially through the through recess.

6. The vial adapter according to claim 2, wherein the guiding receptacle comprises a bottom facing in a longitudinal proximal direction, and wherein the movable part comprises an abutment face facing in a longitudinal distal direction.

7. The vial adapter according to claim 6, comprising a biasing element arranged between the bottom of the guiding receptacle and the abutment face of the movable part, wherein the biasing element is configured to apply a biasing force between the adapter body and the movable part to increase a longitudinal distance between the abutment face and the bottom.

8. The vial adapter according to claim 1, comprising a spike comprising a tipped end facing in a distal direction and configured to penetrate the pierceable stopper.

9. The vial adapter according to claim 1, wherein the movable part comprises an elongated cannula, through which the elongated fluid channel extends longitudinally.

10. An injection kit for administering a liquid medicament, the injection kit comprising:

an injection vial comprising a barrel to accommodate a liquid medicament and comprising a barrel head with an outlet, wherein the outlet is sealed by a pierceable stopper and wherein the pierceable stopper comprises an inside surface, and a vial adapter comprising:

an adapter body comprising a top wall and a sidewall, the sidewall projecting from the top wall in a longitudinal direction to form a receptacle with a distal side of the top wall, wherein the receptacle is configured to receive at least a portion of the barrel head; and a movable part comprising a base part and an elongated fluid channel extending through the top wall along the longitudinal direction, the elongated fluid channel comprising a proximal channel section merging into a mechanical connector and comprising a distal channel section with a channel aperture, wherein the movable part is adjustably movable relative to the adapter body along the longitudinal direction to align the channel aperture with the inside surface of the pierceable stopper, wherein when the channel aperture is aligned with the inside surface of the pierceable stopper, the channel aperture is flush with a distally-facing side of the inside surface, and wherein the elongated fluid channel comprises an elongated channel sidewall and a channel projection, the channel projection (i) is longitudinally aligned with the channel aperture, (ii) comprises a proximally facing abutment face configured to abut longitudinally with the distally-facing side of the inside surface of the pierceable stopper, (iii) extends laterally from an interior of the elongated fluid channel, and (iv) protrudes laterally from the elongated channel sidewall.

11. A method of withdrawing a liquid medicament contained in an injection vial, the method comprising:

engaging a vial adapter with a barrel head of a barrel of the injection vial, wherein the vial adapter comprises an adapter body and a movable part, the movable part comprising an elongated fluid channel comprising a distal channel section with a channel aperture;

penetrating a pierceable stopper of the injection vial in longitudinal distal direction, thereby urging the elongated fluid channel of the vial adapter through the pierceable stopper, wherein the pierceable stopper seals an outlet of the barrel head;

aligning the channel aperture of the elongated fluid channel with an inside surface of the pierceable stopper so that the channel aperture is flush with a distally-facing side of the inside surface by adjustably moving the movable part relative to a base part of the movable part in a longitudinal direction, and engaging a proximally facing abutment face of a channel projection of the elongated fluid channel with the inside surface of the pierceable stopper, wherein the channel projection (i) is longitudinally aligned with the channel aperture, (ii) extends from the elongated fluid channel, and (iii) protrudes from an elongated channel sidewall of the elongated fluid channel.

12. The method according to claim 11, wherein the adapter body of the vial adapter is at least one of engaged, fastened, or fixed to the barrel head of the barrel of the injection vial without penetrating the pierceable stopper.

13. The method according to claim 11, wherein the pierceable stopper is penetrated by moving or urging the movable part of the vial adapter relative to the adapter body in the longitudinal direction.

14. The method according to claim 11, wherein a liquid substance located inside the injection vial is completely or almost completely withdrawn from an interior of the injection vial via the channel aperture.

15. A method of administering an injectable medicament, the method comprising:

using a vial adapter for connecting to an injection vial that comprises a barrel and a barrel head with an outlet, wherein the outlet is sealed by a pierceable stopper and wherein the pierceable stopper comprises an inside surface, and wherein the vial adapter comprises an adapter body comprising a top wall and a sidewall, the sidewall projecting from the top wall in a longitudinal direction to form a receptacle with a distal side of the top wall, wherein the receptacle is configured to receive at least a portion of the barrel head; and a movable part comprising a base part and an elongated fluid channel extending through the top wall along the longitudinal direction, the elongated fluid channel comprising a proximal channel section merging into a mechanical connector and comprising a distal channel section with a channel aperture, wherein the elongated fluid channel comprises an elongated channel sidewall and a channel projection, the channel projection (i) is longitudinally aligned with the channel aperture, (ii) comprises a proximally facing abutment face, (iii) extends laterally from the elongated fluid channel, and (iv) protrudes laterally from the elongated channel sidewall, wherein the movable part is adjustably movable relative to the adapter body along the longitudinal direction to align the channel aperture with the inside surface of the pierceable stopper and to abut the proximally facing abutment face of the channel projection with the inside surface of the pierceable stopper, and wherein when the channel aperture is aligned with the inside surface of the pierceable stopper, the channel aperture is flush with a distally-facing side of the inside surface.

* * * * *